United States Patent
Kaneda et al.

(10) Patent No.: US 9,347,626 B2
(45) Date of Patent: *May 24, 2016

(54) ILLUMINATION DEVICE INCLUDING UNIFORMIZATION OPTICAL MEMBER INCLUDING A PLURALITY OF UNIT CELLS AND DISPLAY UNIT INCLUDING THE ILLUMINATION DEVICE

(71) Applicant: Sony Corporation, Tokyo (JP)

(72) Inventors: Kazumasa Kaneda, Kanagawa (JP); Kazuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 286 days.

This patent is subject to a terminal disclaimer.

(21) Appl. No.: 13/851,636

(22) Filed: Mar. 27, 2013

(65) Prior Publication Data

US 2013/0258215 A1    Oct. 3, 2013

(30) Foreign Application Priority Data

Apr. 2, 2012   (JP) ................................. 2012-083560

(51) Int. Cl.
  *G02B 27/09*  (2006.01)
  *F21K 99/00*  (2016.01)
  *G02F 1/1335*  (2006.01)
  (Continued)

(52) U.S. Cl.
  CPC .............. *F21K 9/58* (2013.01); *G02B 27/0933* (2013.01); *G02B 27/0966* (2013.01); *G02B 27/48* (2013.01); *G02F 1/1336* (2013.01); *G03B 21/208* (2013.01); *G03B 21/2033* (2013.01); *G02B 27/0927* (2013.01); *G02B 27/0961* (2013.01); *H04N 9/3129* (2013.01)

(58) Field of Classification Search
  CPC .......... G02B 27/0927; G02B 27/0933; G02B 27/0961; G02B 27/0966; G02B 27/48; H04N 9/3129; G03B 21/2033; G03B 21/208; G02F 1/1336; F21K 9/58
  USPC .......................................................... 353/94
  See application file for complete search history.

(56) References Cited

U.S. PATENT DOCUMENTS 7,954,962 B2 * 6/2011 Mizushima et al. ............ 353/94
2003/0039036 A1 * 2/2003 Kruschwitz et al. .......... 359/707
(Continued)

FOREIGN PATENT DOCUMENTS

JP   61-212816 A1   9/1986
JP   01-259533 A1   10/1989
(Continued)

OTHER PUBLICATIONS

Japanese Office Action issued on Oct. 20, 2015 in patent application No. 2012083560.

*Primary Examiner* — Bao-Luan Le
(74) *Attorney, Agent, or Firm* — Sony Corporation

(57) ABSTRACT

An illumination device includes: a light source section including a laser light source; a uniformization optical member including a plurality of unit cells which are two dimensionally arranged, and receiving light from the light source section; an optical device disposed on an optical path between the light source section and the uniformization optical member; and a drive section vibrating the optical device, in which an expression (1) is satisfied:

$$\{6 \times f \times \tan(\theta f)\} > Pf \quad (1)$$

where f is a focal length of the unit cell, Pf is a pitch of the unit cell, θf is a marginal ray angle in a light flux emitted from the optical device to enter the uniformization optical member.

14 Claims, 17 Drawing Sheets

(51) Int. Cl.
*G03B 21/20* (2006.01)
*G02B 27/48* (2006.01)
*H04N 9/31* (2006.01)

(56) References Cited

U.S. PATENT DOCUMENTS

2009/0002638 A1\* 1/2009 Lee et al. .................. 353/31
2010/0165307 A1\* 7/2010 Mizushima et al. ........... 353/98
2011/0013149 A1\* 1/2011 Utsunomiya .................. 353/38

FOREIGN PATENT DOCUMENTS

| | | |
|---|---|---|
| JP | 2002-311382 | 10/2002 |
| JP | 2004-138669 A1 | 5/2004 |
| JP | 2011-164151 A1 | 8/2011 |
| JP | 2011187968 A1 | 9/2011 |
| JP | 2012-008549 | 1/2012 |

\* cited by examiner

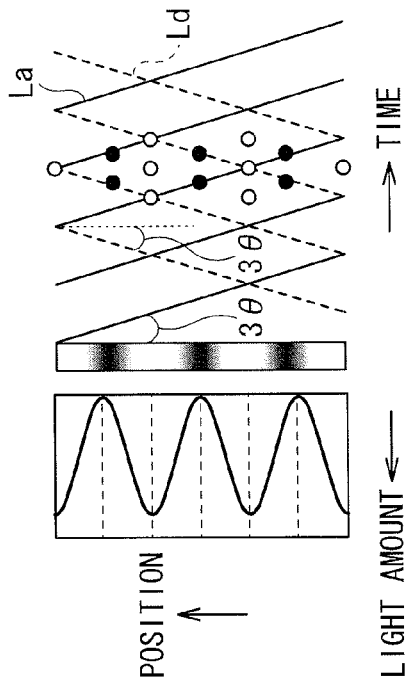
FIG. 10B
COMBINATION OF La AND Ld
(ANGLE BETWEEN WAVEFRONTS: 6θ)
FIG. 10A
COMBINATION OF Lb AND Lc
(ANGLE BETWEEN WAVEFRONTS: 2θ)
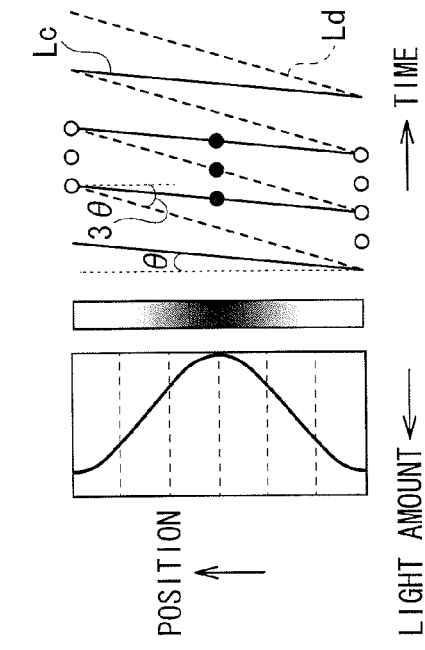
FIG. 10D
COMBINATION OF La ANGLE Lc
(ANGLE BETWEEN WAVEFRONTS: 4θ)
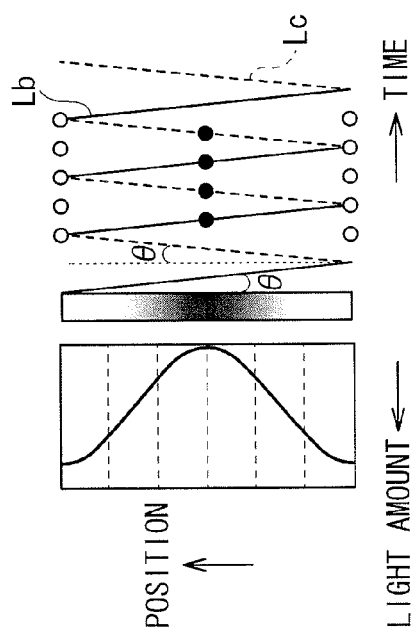
FIG. 10C
COMBINATION OF Lc AND Ld
(ANGLE BETWEEN WAVEFRONTS: 2θ)

| INTERFERENCE FRINGE PITCH CALCULATION EXAMPLE | CALCULATION EXAMPLE 1 (n=10) | CALCULATION EXAMPLE 2 (n=20) |
|---|---|---|
| WAVELENGTH: $\lambda$ [nm] | 532 | 532 |
| EPD [mm] | 6 | 6 |
| FOCAL LENGTH OF CONDENSER LENS: fc [mm] | 12 | 18 |
| F-NUMBER: F | 2.0 | 3.0 |
| NA | 0.25 | 0.17 |
| UNIT CELL NUMBER OF FEL: n | 10 | 20 |
| UNIT CELL PITCH OF FEL: Pf [$\mu$m] | 600 | 300 |
| LENS MAGNIFICATION OF UNIT CELL OF FEL: M | 1 | 1 |
| SIZE OF REFLECTIVE LIQUID CRYSTAL DEVICE [inch] | 0.22 | 0.22 |
| INTERFERENCE FRINGE PITCH p (ON REFLECTIVE LIQUID CRYSTAL DEVICE) [$\mu$m] | 10.6 | 31.9 |
| INTERFERENCE FRINGE PITCH p (ON SCREEN) [mm] | 1.2 | 3.6 |

FIG. 13

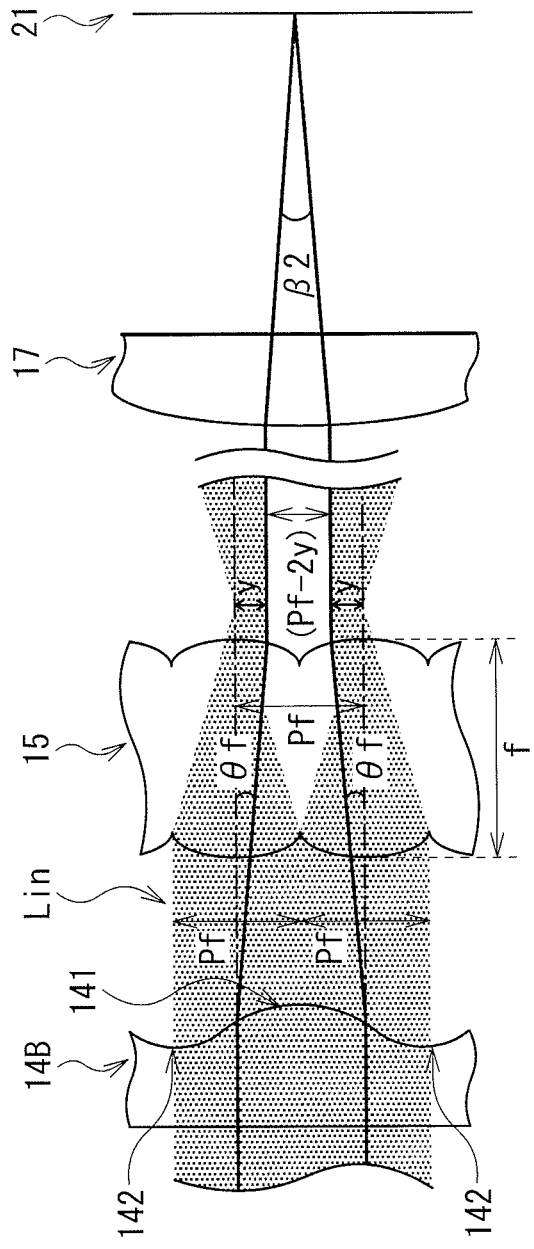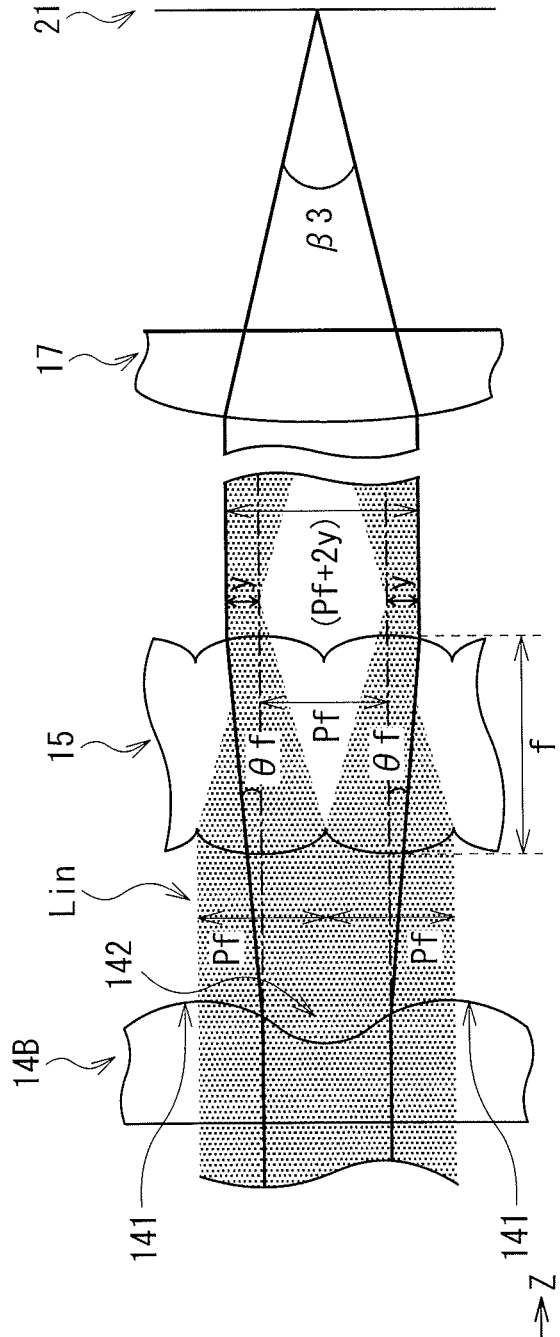
FIG. 16A
FIG. 16B

ILLUMINATION DEVICE INCLUDING UNIFORMIZATION OPTICAL MEMBER INCLUDING A PLURALITY OF UNIT CELLS AND DISPLAY UNIT INCLUDING THE ILLUMINATION DEVICE

CROSS REFERENCES TO RELATED APPLICATIONS

The present application claims priority to Japanese Priority Patent Application JP 2012-083560 filed in the Japan Patent Office on Apr. 2, 2012, the entire content of which is hereby incorporated by reference.

BACKGROUND

The present disclosure relates to an illumination device emitting light including laser light, and a display unit displaying an image with use of such an illumination device.

A typical optical module, which is one of major components in a projector (a projection display unit), is configured of an illumination optical system (an illumination device) including a light source, and a projection optical system including a light modulation device. In the field of such a projector, a small-sized (a palm-sized) lightweight portable projector called "microprojector" has recently become widespread. A typical microprojector mainly uses an LED (Light Emitting Diode) as the light source of the illumination device.

On the other hand, a laser is recently attracting an attention as a new light source of the illumination device. For example, following commercialization of high-power blue laser diodes and high-power red laser diodes, green laser diodes are being developed, and are nearing practical use. Based on such a background, there is proposed a projector using single-color lasers (laser diodes) of three primary colors of red (R), green (G), and blue (B) as light sources of an illumination device. With use of the single-color lasers as the light sources, a projector having a wide color reproduction range and low power consumption is obtainable.

Moreover, in such a projector, to uniformize a light amount (intensity) of illumination light emitted from an illumination device, the illumination device typically includes a predetermined uniformization optical system (a uniformization optical member). For example, in Japanese Unexamined Patent Application Publication Nos. 2002-311382 and 2012-8549, a fly-eye lens is included as such a uniformization optical member.

SUMMARY

In such a projector, a reduction in luminance unevenness (illumination unevenness) in illumination light emitted from the illumination device and an improvement in display image quality are typically desired.

It is desirable to provide an illumination device and a display unit which are capable of reducing luminance unevenness in illumination light.

According to an embodiment of the disclosure, there is provided an illumination device including: a light source section including a laser light source; a uniformization optical member including a plurality of unit cells which are two dimensionally arranged, and receiving light from the light source section; an optical device disposed on an optical path between the light source section and the uniformization optical member; and a drive section vibrating the optical device, in which an expression (1) is satisfied:

$$\{6 \times f \times \tan(\theta f)\} > Pf \qquad (1)$$

where f is a focal length of the unit cell, Pf is a pitch of the unit cell, θf is a marginal ray angle in a light flux emitted from the optical device to enter the uniformization optical member.

According to an embodiment of the disclosure, there is provided a display unit including: an illumination device emitting illumination light; and a light modulation device modulating the illumination light, based on an image signal, in which the illumination device includes a light source section including a laser light source, a uniformization optical member including a plurality of unit cells which are two dimensionally arranged, and receiving light from the light source section, an optical device disposed on an optical path between the light source section and the uniformization optical member, and a drive section vibrating the optical device, and the expression (1) is satisfied.

In the illumination device and the display unit according to the embodiments of the disclosure, light from the light source section passes through the uniformization optical member to uniformize a light amount thereof, and then the light is emitted as illumination light. At this time, the optical device which is disposed on an optical path between the light source section and the uniformization optical member and vibrates, and the uniformization optical member are so configured as to satisfy the above-described expression (1); therefore, even if interference fringes are produced in illumination light by the uniformization optical member, the interference fringes are moved with time to average brightness thereof In the illumination device and the display unit according to the embodiments of the disclosure, the above-described expression (1) is satisfied in the optical device which is disposed on the optical path between the light source section and the uniformization optical member and vibrates, and the uniformization optical member; therefore, even if interference fringes are produced in illumination light by the uniformization optical member, the interference fringes are moved with time to allow brightness thereof to be averaged. Accordingly, such interference fringes become less visible, and a reduction in luminance unevenness in illumination light (an improvement in display image quality) is achievable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

FIGS. 10A to 10D are schematic views for describing a relationship between a combination of outgoing light fluxes illustrated in FIG. 9 and an interference fringe production pattern.

FIG. 13 is a diagram illustrating calculation examples of the interference fringe pitch and the like.

FIGS. 16A and 16B are schematic views for describing incident light onto the fly-eye lens in the case where the optical device is included.

DETAILED DESCRIPTION

Figure 1:
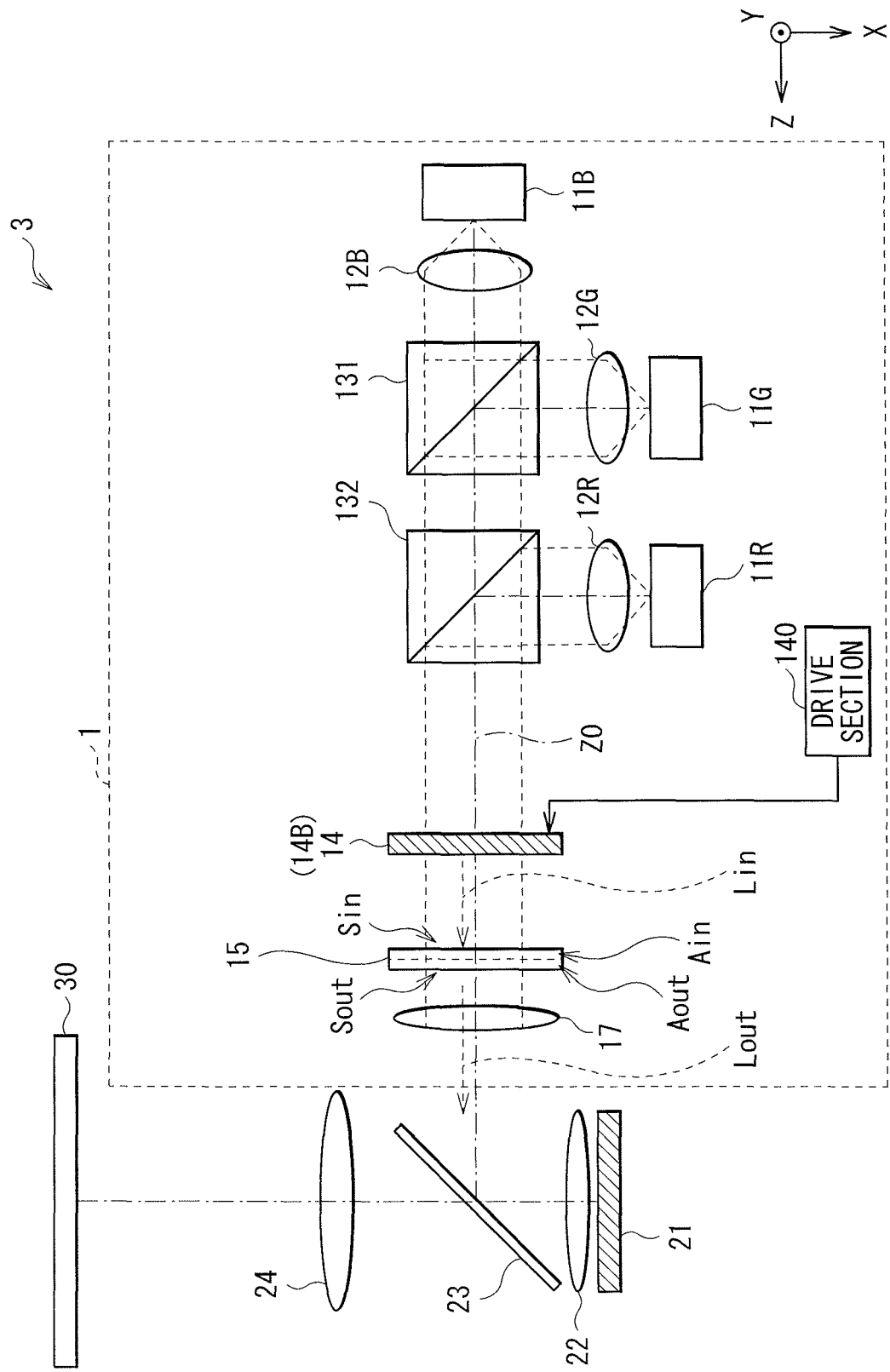
FIG. 1 is a schematic view illustrating an entire configuration example of a display unit according to an embodiment of the disclosure.

An embodiment of the disclosure will be described in detail below referring to the accompanying drawings. It is to be noted that description will be given in the following order.
1. Embodiment (An example in which a conditional expression is established for both an optical device and a uniformization optical member disposed in a stage following the optical device)
2. Modification (An example in which an optical device is configured of a prism array)
3. Other Modifications
(Embodiment)
[Entire Configuration of Display Unit 3]
FIG. 1 illustrates an entire configuration of a display unit (a display unit 3) according to an embodiment of the disclosure. The display unit 3 is a projection display unit which projects an image (image light) onto a screen 30 (a projection surface). The display unit 3 includes an illumination device 1 and an optical system (a display optical system) for displaying an image with use of illumination light emitted from the illumination device 1.

(Illumination Device 1)

The illumination device 1 includes a red laser 11R, a green laser 11G, a blue laser 11B, coupling lenses 12R, 12G, and 12B, dichroic prisms 131 and 132, an optical device 14, a drive section 140, a fly-eye lens 15, and a condenser lens 17. It is to be noted that Z0 illustrated in the drawing represents an optical axis.

The red laser 11R, the green laser 11G, and the blue laser 11B are three kinds of light sources emitting red laser light, green laser light, and blue laser light, respectively. A light source section is configured of these laser light sources, and each of these three kinds of light sources in this case is a laser light source. Each of the red laser 11R, the green laser 11G, and the blue laser 11B performs, for example, pulse light emission. In other words, each of them intermittently (discontinuously) emits laser light with use of, for example, a predetermined light emission frequency (light emission cycle). Each of the red laser 11R, the green laser 11G, and the blue laser 11B is configured of, for example, a laser diode or a solid laser. It is to be noted that, in the case where each of these laser light sources is a laser diode, a wavelength $\lambda r$ of the red laser light is about 600 nm to 700 nm, a wavelength g of the green laser light is about 500 nm to 600 nm, and a wavelength $\lambda b$ of the blue laser light is about 400 nm to 500 nm.

Figure 2A:
FIGS. 2A and 2B are diagrams illustrating an example of a light amount distribution in laser light.
Figure 2B:
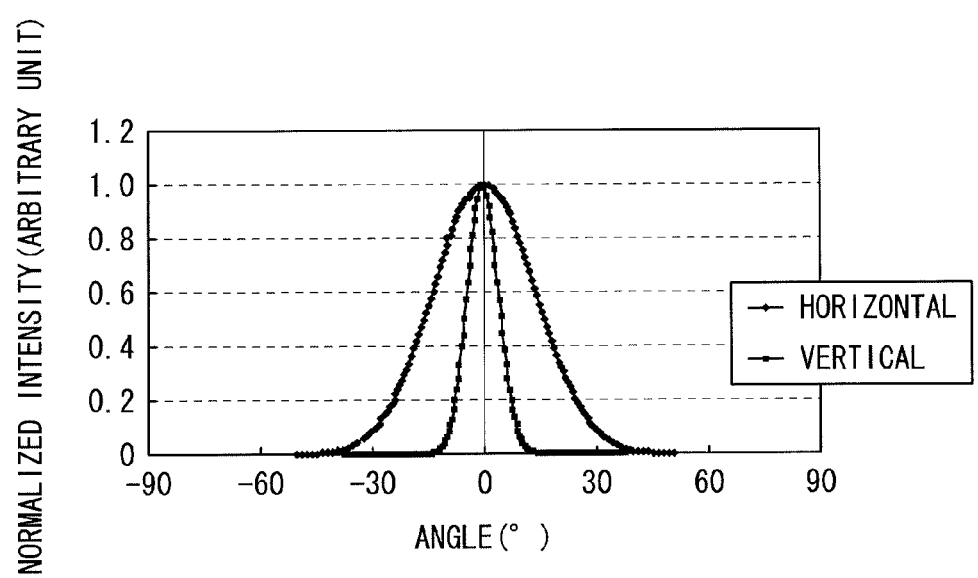

Moreover, laser light emitted from these light sources is generated through entering exciting light into a laser medium made of a laser crystal. In this case, an intensity distribution (a light amount distribution, an FFP (Far Field Pattern)) of the laser light is determined by a distribution of atoms or molecules of the laser crystal as the laser medium and the size of the crystal. For example, as illustrated in FIGS. 2A and 2B, an ideal light amount distribution (profile) of laser light generated is nearly a Gaussian distribution. It is to be noted that, "horizontal" and "vertical" in FIG. 2B refer to light amount distributions along a horizontal direction (in this case, an X-axis direction) and a vertical direction (in this case, a Y-axis direction), respectively.

The coupling lens 12G is a lens (a coupling lens) for collimating green laser light emitted from the green laser 11G (into parallel light) to couple the collimated green laser light to the dichroic prism 131. Likewise, the coupling lens 12B is a lens (a coupling lens) for collimating blue laser light emitted from the blue laser 11B to couple the collimated blue laser light to the dichroic prism 131. Moreover, the coupling lens 12R is a lens (a coupling lens) for collimating red laser light emitted from the red laser 11R to couple the collimated red laser light to the dichroic prism 132. It is to be noted that each of these coupling lenses 12R, 12G, and 12B in this case collimates incident laser light (into parallel light), but this is not limitative, and the laser light may not be collimated (into parallel light) by the coupling lenses 12R, 12G, and 12B. However, it is more preferable to collimate the laser light in the above-described manner, because downsizing of a unit configuration is achievable.

The dichroic prism 131 selectively allows the blue laser light incident thereon through the coupling lens 12B to pass therethrough and selectively reflects the green laser light incident thereon through the coupling lens 12G. The dichroic prism 132 selectively allows the blue laser light and the green laser light emitted from the dichroic prism 131 to pass therethrough and selectively reflects the red laser light incident thereon through the coupling lens 12R. Thus, color synthesis (optical path synthesis) of the red laser light, the green laser light, and the blue laser light is performed.

The optical device 14 is a device disposed on an optical path of outgoing light (laser light) from the above-described light source section. In this case, the optical device 14 is disposed on an optical path between the light source section and the fly-eye lens 15 (more specifically, between the dichroic prism 132 and the fly-eye lens 15). The optical device 14 is an optical device for reducing so-called speckle noise and interference fringes which will be described later in illumination light, and allows laser light traveling along the above-described optical path to passes therethrough. It is to be noted that, instead of the optical device 14, an optical device 14B which will be described later may be included.

The drive section 140 drives the optical device 14 (or the optical device 14B which will be described later). More specifically, the drive section 140 has a function of vibrating (micro-vibrating) the optical device 14 or 14B (for example, vibrating the optical device 14 or 14B in a direction along the optical axis Z0 or a direction perpendicular to the optical axis Z0). As will be described in detail later, this function changes the state of a light flux passing through the optical device 14 or 14B to reduce speckle noise and interference fringes. It is to be noted that such a drive section 140 includes, for example, a coil and a permanent magnet (for example, a permanent magnet made of neodymium (Nd), iron (Fe), boron (B), or the like).

Figure 3A:
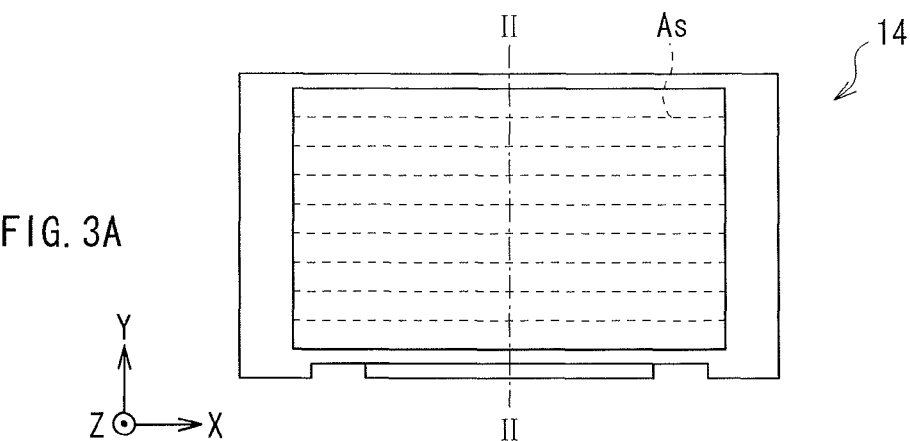
FIGS. 3A to 3C are schematic views illustrating a configuration example of an optical device illustrated in FIG. 1.
Figure 3B:
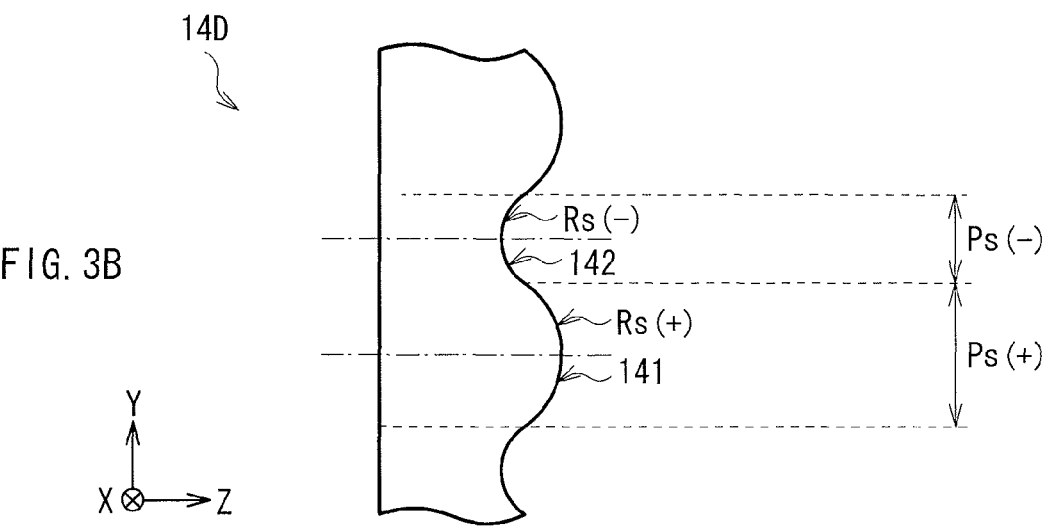
Figure 3C:
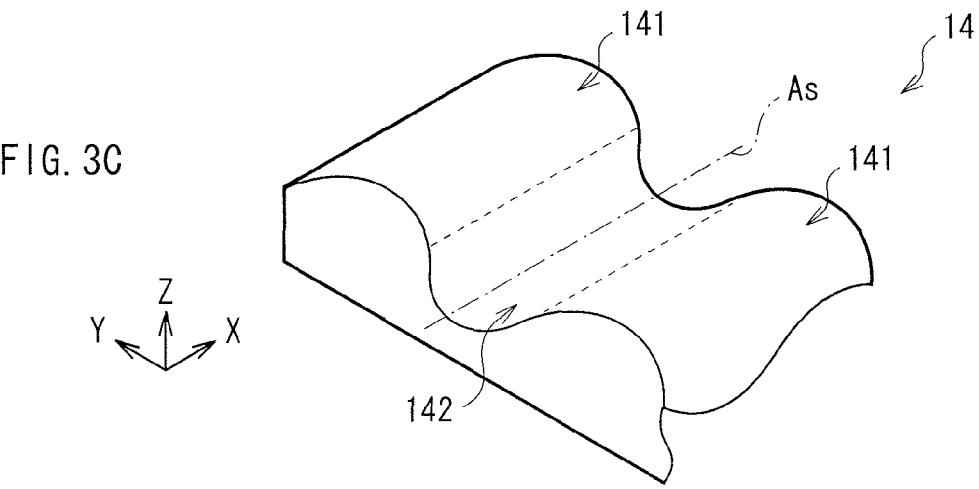

FIGS. 3A to 3C schematically illustrate a configuration example of the above-described optical device 14. The optical device 14 has a concavo-convex surface with a periodic corrugated shape on a light-exit surface thereof. FIG. 3A illustrates an X-Y planar configuration example of the optical device 14, and FIG. 3B illustrates a sectional configuration example taken along a line II-II of FIG. 3A.

As illustrated in FIG. 3B, the optical device 14 has, on the light-exit surface thereof, a configuration in which first optical surfaces 141 with a convex-curved shape and second optical surfaces 142 with a concave-curved shape are alternately arranged (one-dimensionally arranged). It is to be noted that, here, a pitch and a curvature radius of the first optical surface 141 are $Ps(+)$ and $Rs(+)$, respectively, and a pitch and a curvature radius of the second optical surface 142 are $Ps(-)$ and $Rs(-)$, respectively. In this example, the pitch $Ps(+)$ of the first optical surface 141 and the pitch $Ps(-)$ of the second optical surface 142 are different from each other (in this case, $Ps(+)>Ps(-)$).

In the optical device 14, these first optical surfaces 141 and these second optical surfaces 142 extend along the X-axis direction. In other words, extending directions of the first optical surfaces 141 and the second optical surfaces 142 and an arrangement direction of unit cells (incident-side unit cells Cin and exit-side unit cells Cout) in the fly-eye lens 15 which will be described later coincide with each other. It is to be noted that the extending directions of the first optical surfaces 141 and the second optical surfaces 142 correspond to an optical-surface-extending axis (a cylinder axis) As illustrated in FIGS. 3A and 3C.

Figure 4:
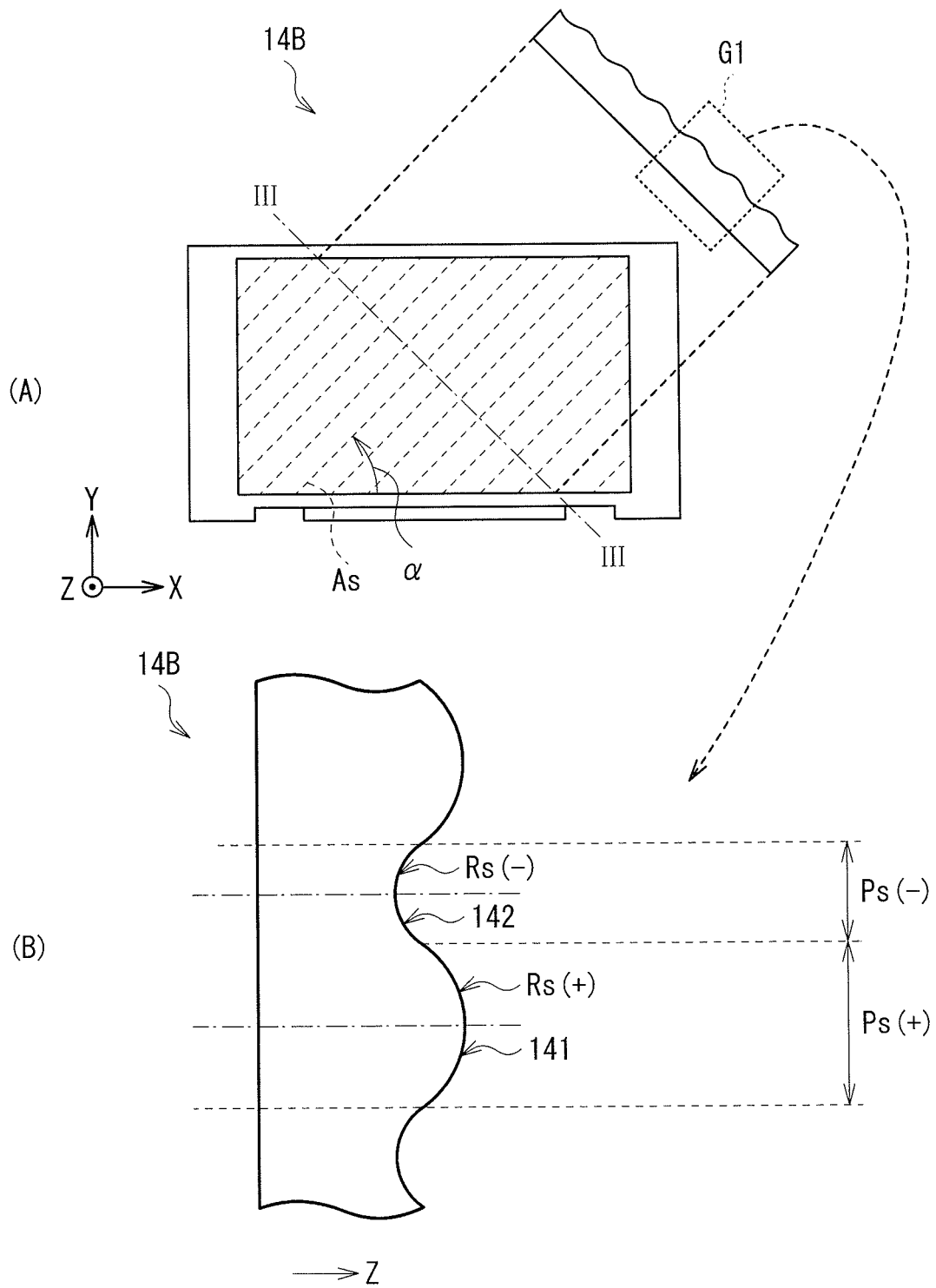
FIG. 4 is a schematic view illustrating another configuration example of the optical device illustrated in FIG. 1.

Moreover, parts (A) and (B) in FIG. 4 schematically illustrate a configuration example of the above-described optical device 14B. As with the above-described optical device 14, the optical device 14B has, on a light-exit surface thereof, a concavo-convex surface with a periodic corrugated shape. The part (A) in FIG. 4 illustrates an X-Y planar configuration of the optical device 14B and a sectional configuration taken along a line III-III in the drawing, and the part (B) in FIG. 4 is an enlarged view of a part indicated by G1 in the part (A) in FIG. 4.

As illustrated in the (B) in FIG. 4, the optical device 14B has, on the light-exit surface thereof, a configuration in which the first optical surfaces 141 with a convex-curved shape and the second optical surfaces 142 with a concave-curved shape are alternately arranged (one-dimensionally arranged). The optical device 14B basically has a configuration similar to that of the optical device 14.

However, in the optical device 14B, unlike the optical device 14, the first optical surfaces 141 and the second optical surfaces 142 are inclined with respect to an X axis and a Y axis (the arrangement direction of the unit cells in the fly-eye lens 15). In other words, the extending directions of the first optical surfaces 141 and the second optical surface 142 (the optical-surface-extending axis As) and the above-described arrangement direction of the unit cells are inclined with respect to each other. In this case, as an example, an inclination angle a between the extending directions of the first optical surfaces 141 and the second optical surfaces 142 and the X axis is 45°.

Figure 5:
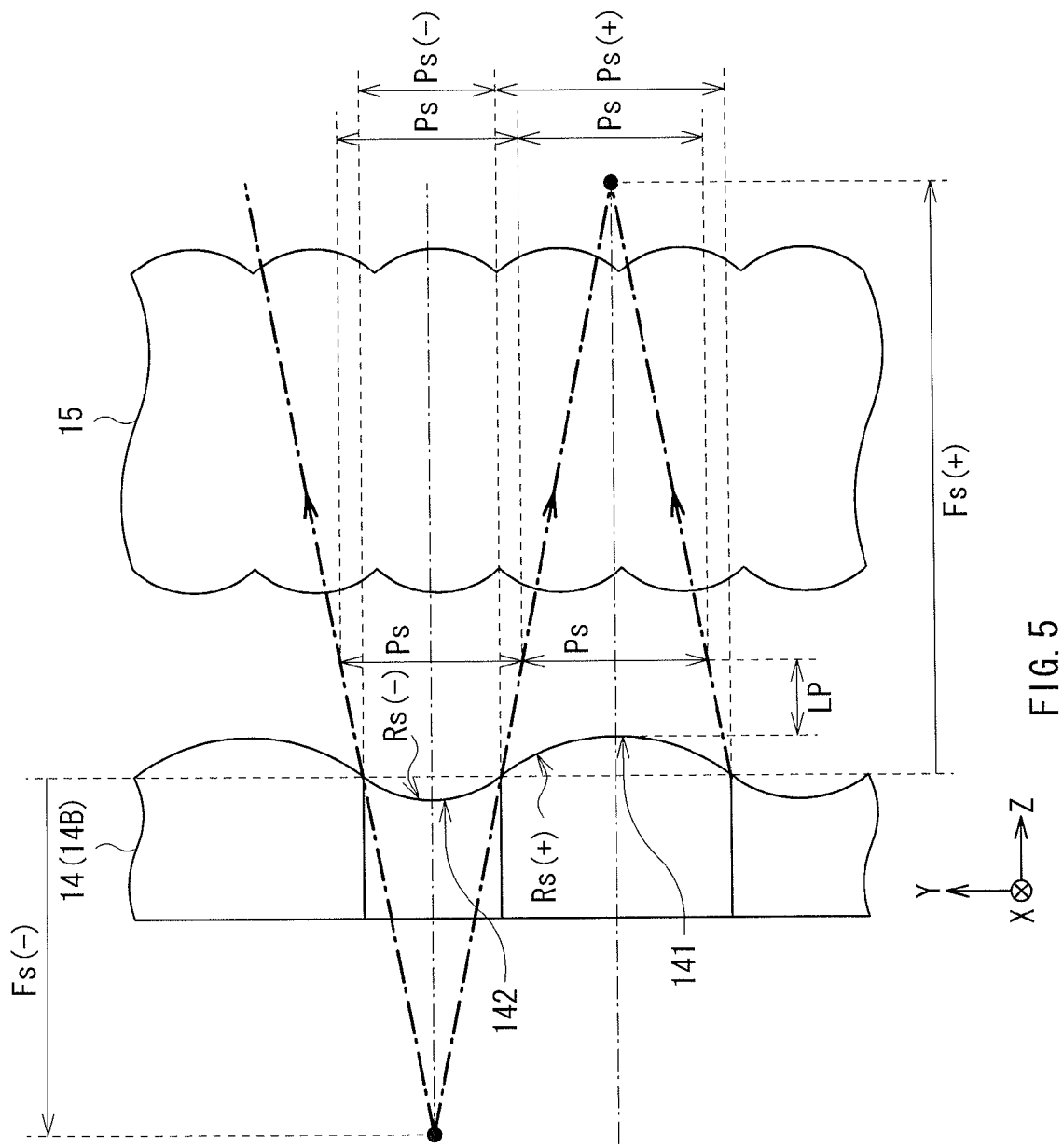
FIG. 5 is a schematic view illustrating a specific configuration example of the optical devices illustrated in FIGS. 3A to 3C and FIG. 4.

For example, as schematically illustrated in FIG. 5, in these optical devices 14 and 14B, the first optical surfaces 141 have a function of emitting laser light incident thereon while converging the laser light, whereas the second optical surfaces 142 have a function of emitting laser light incident thereon while diffusing the laser light. In each of the optical devices 14 and 14B, these first optical surfaces 141 and the second optical surfaces 142 are so connected to one another smoothly as to allow an optical path of convergent light emitted from the first optical surfaces 141 and an optical path of divergent light emitted from the second optical surfaces 142 to continuously (sparsely and densely) vary. It is to be noted that, in FIG. 5, $Fs(+)$ denotes a focal length in the first optical surface 141, and $Fs(-)$ denotes a focal length in the second optical surface 142. Moreover, LP denotes a distance between a plane where a light flux width of convergent light emitted from the first optical surface 141 and a light flux width of divergent light emitted from the second optical surface 142 become equal to each other (both the light flux widths of the convergent light and the divergent light become equal to a pitch Ps) and the optical device 14 or 14B.

The fly-eye lens 15 is an optical member (an integrator) configured of a plurality of lenses (unit cells which will be described later) which are two-dimensionally arranged on a substrate. The fly-eye lens 15 spatially divides an incident light flux into a plurality of light fluxes according to the arrangement of these lenses to emit the light fluxes. The fly-eye lens 15 is disposed on an optical path in a stage following the above-described optical device 14 or 14B (in this case, between the optical device 14 or 14B and the condenser lens 17). Moreover, the fly-eye lens 15 emits the divided light fluxes while superimposing the divided light fluxes on one another. Thus, outgoing light Lout from the fly-eye lens 15 is uniformized (an in-plane light amount distribution is uniformized), and the uniformized light is emitted as illumination light. In other words, the fly-eye lens 15 corresponds to a specific example of "uniformization optical member" in the disclosure. It is to be noted that, in the fly-eye lens 15, obliquely incident light is efficiently used as illumination light; therefore, as will be described later, unit cells (unit lenses having a predetermined curvature) are formed not only on a light-incident surface of the fly-eye lens 15 but also on a light-exit surface of the fly-eye lens 15.

In this case, the fly-eye lens 15 includes an incident-side array Ain, which is configured of a plurality of unit cells arranged on a light-incident surface Sin thereof where the incident light Lin enters from the above-described light source section. Moreover, in addition to the incident-side array Ain, the fly-eye lens 15 includes an exit-side array Aout, which is configured of a plurality of unit cells arranged on a light-exit surface Sout thereof where the outgoing light Lout exits.

Figure 6:
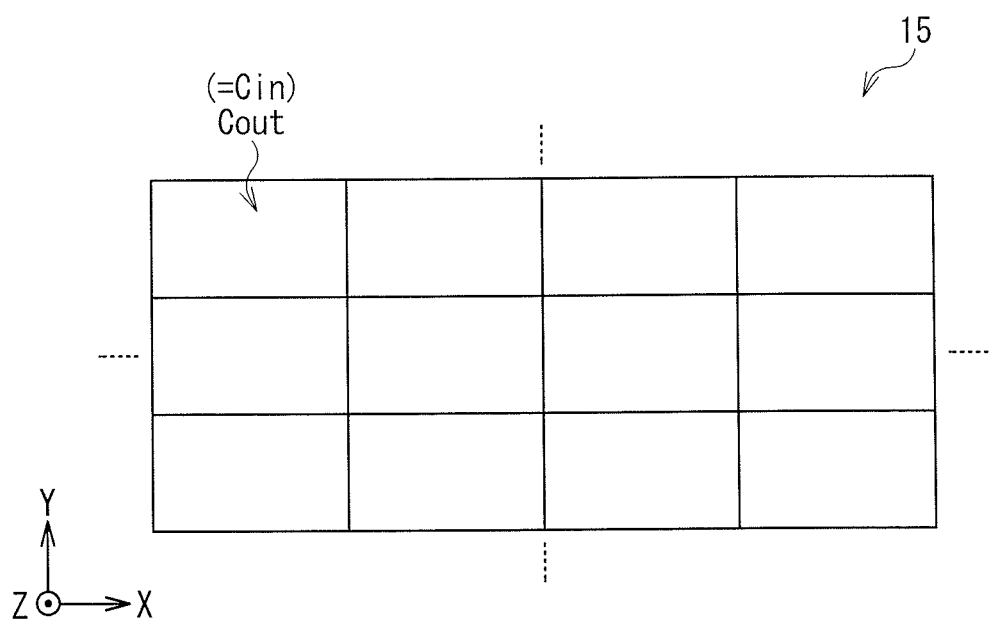
FIG. 6 is a schematic view illustrating a configuration example of a fly-eye lens illustrated in FIG. 1.

More specifically, for example, as illustrated in FIG. 6, the fly-eye lens 15 includes a plurality of incident-side unit cells Cin on the light-incident surface Sin thereof and a plurality of exit-side unit cells Cout on the light-exit surface Sout thereof In this case, the incident-side unit cells Cin and the exit-side unit cells Cout are common to each other (are formed in common with each other). In other words, one incident-side unit cell Cin and one exit-side unit cell Cout configures one common unit cell.

In the fly-eye lens 15, such a plurality of common unit cells (the incident-side unit cells Cin and the exit-side unit cells Cout) are arranged along both the X-axis direction (in this case, a horizontal direction) and the Y-axis direction (in this case, a vertical direction). In other words, the incident-side unit cells Cin and the exit-side unit cells Cout are two-dimensionally arranged without space (in this case, in a matrix form) on X-Y planes (the light-incident surface Sin and the light-exit surface Sout, respectively). Moreover, each of the common unit cells (the incident-side unit cells Cin and the exit-side unit cells Cout) has an anisotropic shape (in this case, a rectangular shape) having a major-axis direction along the X-axis direction and a minor-axis direction along the Y-axis direction. Then, an aspect ratio (a ratio of a length in the major-axis direction to a length in the minor-axis direction) in the anisotropic shape (the rectangular shape) is adjusted to be substantially equal to (preferably, equal to) an aspect ratio in a reflective liquid crystal device 21 which will be described later.

The condenser lens 17 is a lens for condensing the outgoing light Lout from the fly-eye lens 15 to emit the condensed outgoing light Lout as illumination light.

(Display Optical System)

The above-described display optical system is configured of a polarization beam splitter (PBS) 23, a field lens 22, the reflective liquid crystal device 21, and a projection lens 24 (a projection optical system).

The polarization beam splitter 23 is an optical member selectively allowing specific polarized light (for example, p-polarized light) to pass therethrough and selectively reflecting the other polarized light (for example, s-polarized light). Illumination light (for example, s-polarized light) emitted from the illumination device 1 is selectively reflected by the polarization beam splitter 23 to enter the reflective liquid crystal device 21, and image light (for example, p-polarized light) emitted from the reflective liquid crystal device 21 selectively passes through the polarization beam splitter 23 to enter the projection lens 24.

The field lens 22 is disposed on an optical path between the polarization beam splitter 23 and the reflective liquid crystal device 21. The field lens 22 is a lens for downsizing the optical system through allowing illumination light to telecentrically enter the reflective liquid crystal device 21.

The reflective liquid crystal device 21 is a light modulation device reflecting illumination light from the illumination device 1 while modulating the illumination light based on an image signal supplied from a display control section (not illustrated) to emit image light. At this time, the reflective liquid crystal device 21 reflects light to allow light incident thereon and light exiting therefrom to have different polarization states (for example, s-polarization and p-polarization). The reflective liquid crystal device 21 is configured of, for example, a liquid crystal device such as an LCOS (Liquid Crystal On Silicon).

The projection lens 24 is a lens for projecting (projecting in a magnified form), onto the screen 30, the illumination light (the image light) modulated by the reflective liquid crystal device 21.

[Conditional Expression Between Optical Device 14 or 14B and Fly-Eye Lens 15]

Now, in the illumination device 1 according to the embodiment, the optical device 14 (or the optical device 14B) and the fly-eye lens 15 disposed in a stage following (on a light-exit side of) the optical device 14 (or 14B) are so configured as to satisfy a predetermined conditional expression which will be described below. Thus, as will be described later, production of interference fringes in illumination light is reduced. The conditional expression will be briefly described below.

First, the illumination device 1 is so configured as to satisfy the following expression (1).

$$\{6 \times f \times \tan(\theta f)\} > Pf \quad (1)$$

where f is a focal length of the unit cell (the incident-side unit cell Cin, the exit-side unit cell Cout) in the fly-eye lens 15, Pf is a pitch of the unit cell in the fly-eye lens 15, θf is a marginal ray angle in a light flux (a light flux of the incident light Lin) emitted from the optical device 14 or 14B and then entering the fly-eye lens 15.

Moreover, in this case, since, as described above, each of the incident-side unit cells Cin and the exit-side unit cells Cout has an anisotropic shape (a rectangular shape having the major-axis direction (the X-axis direction) and the minor-axis direction (the Y-axis direction)), the above-described expression (1) is satisfied for both the major-axis direction and the minor-axis direction. In other words, both the following expressions (2) and (3) are satisfied, where a pitch and a marginal ray angle of the unit cell along the X-axis direction (the horizontal direction) as the major-axis direction are Pfh and θfh, respectively, and a pitch and a marginal ray angle of the unit cell along the Y-axis direction (the vertical direction) as the minor-axis direction are Pfv and θfv, respectively.

$$\{6 \times f \times \tan(\theta fh)\} > Pfh \quad (2)$$

$$\{6 \times f \times \tan(\theta fv)\} > Pfv \quad (3)$$

Moreover, in the embodiment, both the following expressions (4) and (5) are preferably further satisfied with use of the optical device 14B. Thus, as will be described later, production of interference fringes are effectively suppressed.

In other words, in the case where an extending direction (the optical-surface-extending axis As) of the optical surface in the optical device 14B and the arrangement direction of the unit cells in the fly-eye lens 15 are inclined with respect to each other (at the inclination angle α), both the following expressions (4) and (5) are preferably satisfied. It is to be noted that, in this case, a pitch along the major-axis direction (in this case, the X-axis direction) of the unit cell (with an anisotropic shape) in the fly-eye lens 15 is Pf, and an aspect ratio in each unit cell is X:Y (X>Y) (refer to FIG. 17B which will be described later).

$$\{6 \times f \times \tan(\theta f \times \sin\alpha)\} > Pf \quad (4)$$

$$\{6 \times f \times \tan(\theta f \times \cos\alpha)\} > \{(Y/X) \times Pf\} \quad (5)$$

Further, in the embodiment, as an upper limit condition of the above-described marginal ray angle θf, the following expression (6) is preferably further satisfied. Thus, as will be described later, a light amount loss in outgoing light (laser light) from the light source section is reduced to improve light use efficiency.

$$\{f \times \tan(\theta f \times \cos\alpha)\} < \{(1/2) \times (Y/X) \times Pf\} \quad (6)$$

[Functions and Effects of Display Unit 3]

(1. Display Operation)

In the display unit 3, as illustrated in FIG. 1, first, in the illumination device 1, light (laser light) emitted from the red laser 11R, the green laser 11G, and the blue laser 11B is collimated by the collimator lenses 12R, 12G, and 12B into parallel light, respectively. Next, the dichroic prisms 131 and 132 perform color synthesis (optical path synthesis) of the laser light (the red laser light, the green laser light, and the blue laser light) which is converted into the parallel light in the above-described manner. Each laser light subjected to the optical path synthesis passes through the optical device 14, the fly-eye lens 15, and the condense lens 17 in this order to exit as illumination light from the illumination device 1. At this time, the outgoing light Lout from the fly-eye lens 15 is uniformized (the in-plane light amount distribution is uniformized) by the fly-eye lens 15. Thus, the illumination light is emitted from the illumination device 1.

Next, the illumination light is selectively reflected by the polarization beam splitter 23 to enter the reflective liquid crystal device 21 through the field lens 22. The reflective liquid crystal device 21 reflects the light incident thereon while modulating the light based on the image signal to emit the reflected and modulated light as image light. Since the reflective liquid crystal device 21 allows light incident thereon and light exiting therefrom to have different polarization states, the image light emitted from the reflective liquid crystal device 21 selectively passes through the polarization beam splitter 23 to enter the projection lens 24. Then, the incident light (the image light) is projected (projected in a magnified form) onto the screen 30 by the projection lens 24.

At this time, the red laser 11R, the green laser 11G, and the blue laser 11B intermittently perform light emission with use of, for example, a predetermined light emission frequency. Thus, each laser light (the red laser light, the green laser light, and the blue laser light) is sequentially emitted in a time-divisional manner. Then, based on image signals of respective color components (a red component, a green component, and a blue component), the reflective liquid crystal device 21 sequentially modulates laser light of corresponding colors in a time-divisional manner. Thus, a color image based on the image signals is displayed in the display unit 3.

(2. Function of Reducing Speckle Noise)

Next, a function (a function of reducing speckle noise in illumination light) of the optical devices 14 and 14B will be described below.

First, the speckle noise refers to a pattern with flecks observed when a diffusing surface is irradiated with coherent light such as laser light. The speckle noise is produced by the interference of light scattered at points on the diffusing surface with a random phase relationship according to microscopic roughness on the diffusing surface.

To reduce speckle noise produced in illumination light in such a manner, in the illumination device 1, as illustrated in FIG. 1, the optical device 14 (or the optical device 14B) is disposed on an optical path of laser light. Moreover, the fly-eye lens 15 is disposed in a stage following the optical device 14 or 14B (on a light-exit side of the optical device 14 or 14B). Then, the optical device 14 or 14B is so driven by the drive section 140 as to vibrate.

(Function of Optical Device 14)

Figure 7:
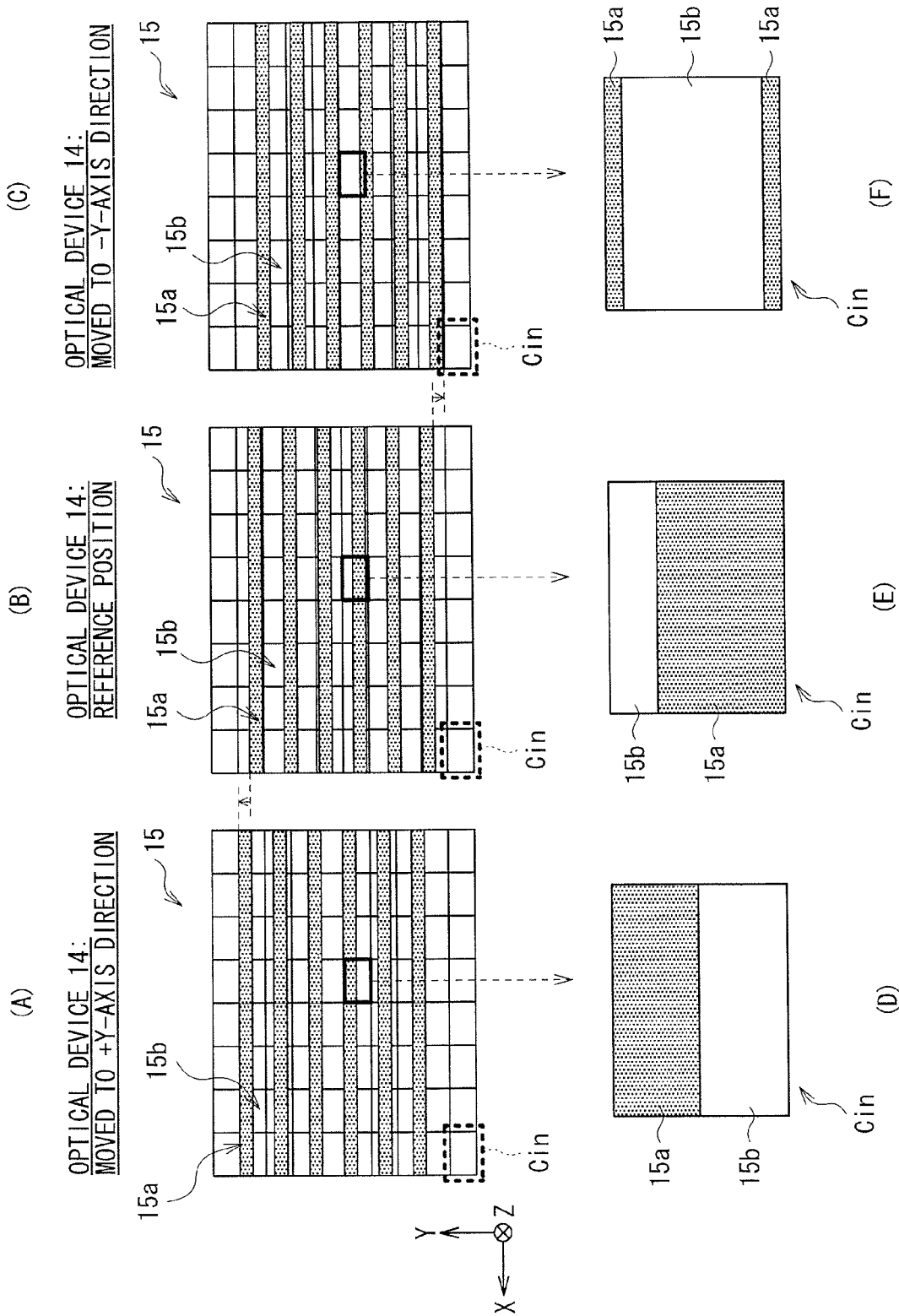
FIG. 7 is a schematic view for describing a function of the optical device illustrated in FIGS. 3A to 3C.

More specifically, first, in the case of the optical device 14, for example, as illustrated in parts (A) to (C) in FIG. 7, the optical device 14 is so driven by the drive section 140 as to move a relative position thereof to the fly-eye lens 15 along a +Y-axis direction and a −Y-axis direction from a reference position. It is to be noted that the parts (A) to (C) in FIG. 7 schematically illustrate convergent light flux regions 15a and divergent light flux regions 15b on a plane located at the distance LP from the above-described optical device 14, which are superimposed on the respective incident-side unit cells Cin in the fly-eye len 15. Parts (D) to (F) in FIG. 7 schematically illustrate the convergent light flux regions 15a and the divergent light flux regions 15b in a region on the incident-side unit cell Cin encircled by a heavy line in the parts (A) to (C) in FIG. 7.

When the optical device 14 is so driven as to vibrate along the Y axis in such a manner, for example, as illustrated in the parts (D) to (F) in FIG. 7, the convergent light flux regions 15a and the divergent light flux regions 15b are moved back and forth in the region on each of the incident-side unit cells Cin. As a result, speckle patterns are multiplexed (time-averaged) to reduce production of the above-described speckle noise.

(Function of Optical Device 14B)

Figure 8:
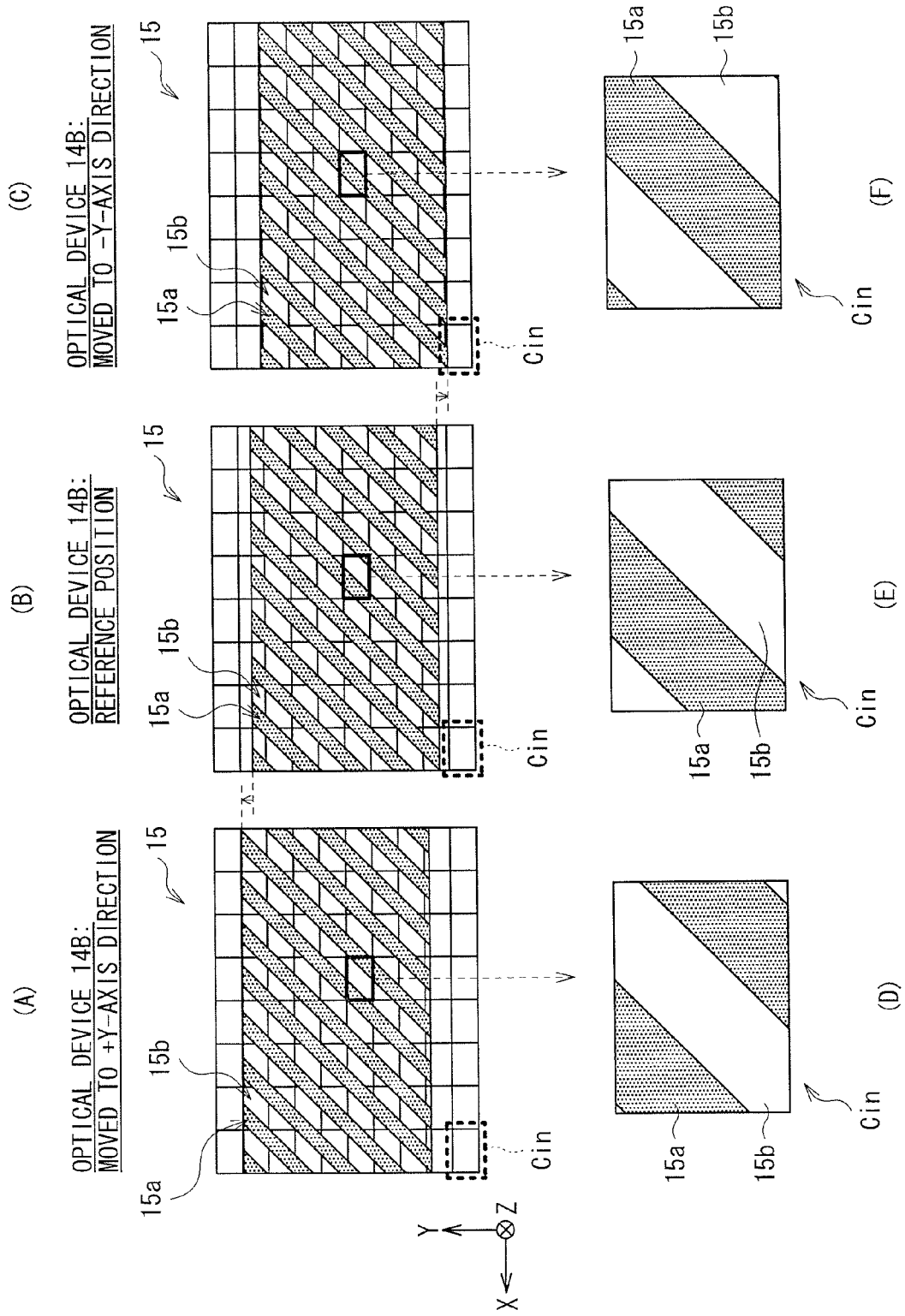
FIG. 8 is a schematic view for describing a function of the optical device illustrated in FIG. 4.

On the other hand, the optical device 14B is so driven by the drive section 140 to move a relative position thereof to the fly-eye lens 15 along the +Y-axis direction and the −Y-axis direction from the reference position, as illustrated in parts (A) to (F) in FIG. 8.

Also in this case, when the optical device 14B is so driven as to vibrate along the Y axis, for example, as illustrated in the parts (D) to (F) in FIG. 8, the convergent light flux regions 15a and the divergent light flux regions 15b are moved back and forth in the region on each of the incident-side unit cells Cin. As a result, as with the above-described optical device 14, speckle patterns are multiplexed (time-averaged) to reduce production of the above-described speckle noise.

(3. Function of Reducing Interference Fringes)

Next, the function of reducing interference fringes caused by the fly-eye lens 15 will be described in detail below.

(Principle of Producing Interference Fringes)

First, referring to FIGS. 9 to 13, a principle of producing the above-described interference fringes (interference fringes produced in illumination light emitted from the illumination device 1) will be described below.

First, in the case where the fly-eye lens is provided as an uniformization optical member in the illumination device, typically, interference fringes (luminance unevenness, illumination unevenness) are produced in the illumination light by interference (superimposition) of outgoing light fluxes from a plurality of unit cells (unit lenses) regularly arranged in the fly-eye lens. As a result, luminance unevenness is also caused in a projected image on the screen, resulting in a reduction in display image quality. As will be described later, although a pitch of the interference fringes is the order of several micrometers on the reflective liquid crystal device uniformly irradiated, the pitch is increased to the order of several millimeters in a projected image magnified by the projection lens. Accordingly, considerably large interference fringes are produced on the screen.

Figure 9:
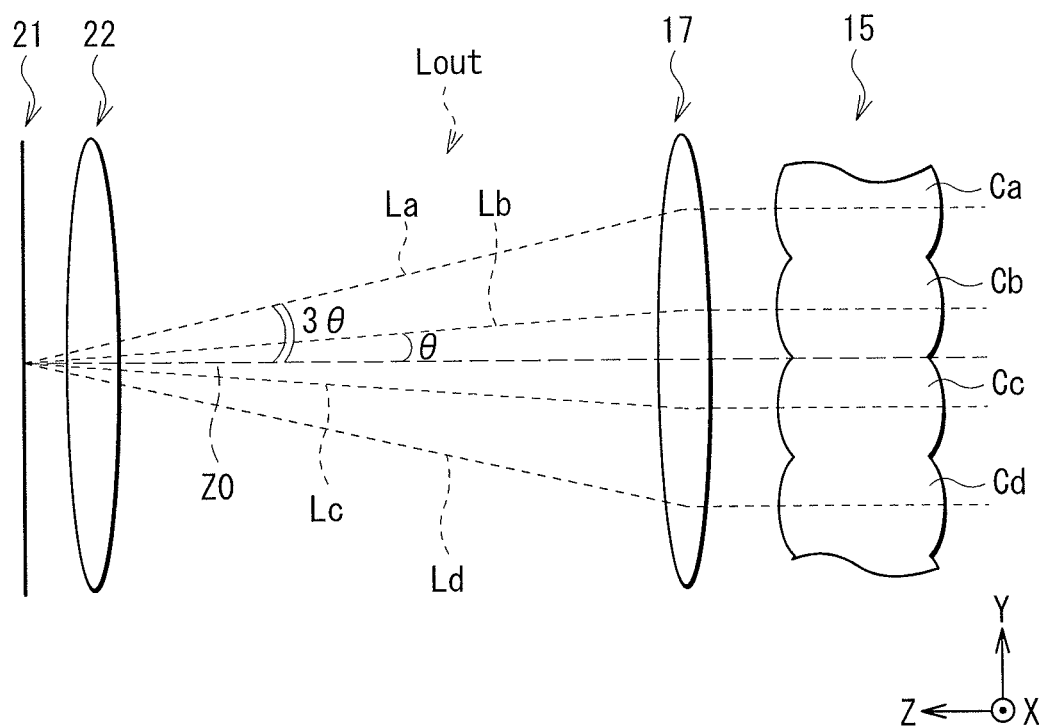
FIG. 9 is a schematic view for describing outgoing light from a unit cell in the fly-eye lens.

As an example, as illustrated in FIG. 9, interference fringes produced by superimposition of outgoing light fluxes from four adjacent unit cells Ca, Cb, Cc, and Cd in the fly-eye lens 15 is considered. It is to be noted that, in this example, the outgoing light fluxes from the unit cells Ca, Cb, Cc, and Cd are La, Lb, Lc, and Ld, respectively. Moreover, as illustrated in FIG. 9, an angle between the outgoing light flux La and an optical axis Z0 is θ, and an angle between the outgoing light flux Lb and the optical axis Z0 is 3θ.

In this case, for example, by patterns illustrated in FIGS. 10A to 10D, interference fringes are produced by superimposition of the outgoing light fluxes (equal-phase light fluxes) from the unit cells Ca, Cb, Cc, and Cd. In this case, FIG. 10A schematically illustrates a pattern of interference fringes produced by a combination (superimposition) of the outgoing light fluxes Lb and Lc, and in this case, an angle between wavefronts of the outgoing light fluxes Lb and Lc is 2θ. Moreover, FIG. 10B schematically illustrates a pattern of interference fringes produced by a combination of the outgoing light fluxes La and Ld, and in this case, an angle between wavefronts of the outgoing light fluxes La and Ld is 6θ. FIG. 10C schematically illustrates a pattern of intereference fringes produced by a combination of the outgoing light fluxes Lc and Ld, and in this case, an angle between wavefronts of the outgoing light fluxes Lc and Ld is 2θ. FIG. 10D schematically illustrates a pattern of intereference fringes produced by a combination of the outgoing light fluxes La and Lc, and in this case, an angle between wavefronts of the outgoing light fluxes La and Lc is 4θ. It is to be noted that, in FIGS. 10A to 10D (and the following FIG. 11A), a white circle point denotes a state where luminance is relatively high, and a black circuit point denotes a state where luminance is relatively low.

Figure 11A:
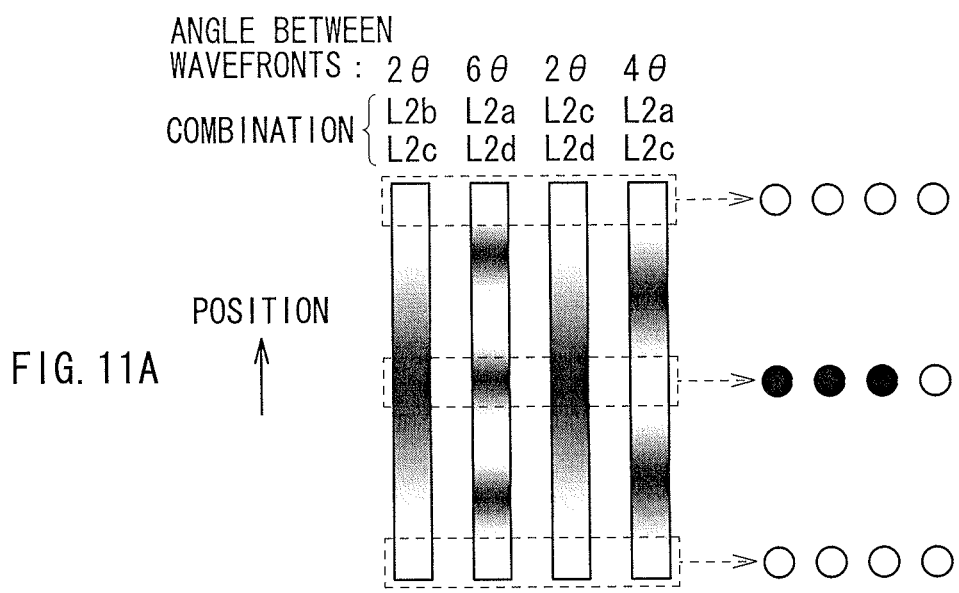
FIGS. 11A and 11B are schematic views illustrating an example of interference fringes produced by the combination of the outgoing light fluxes illustrated in FIGS. 10A to 10D.
Figure 11B:
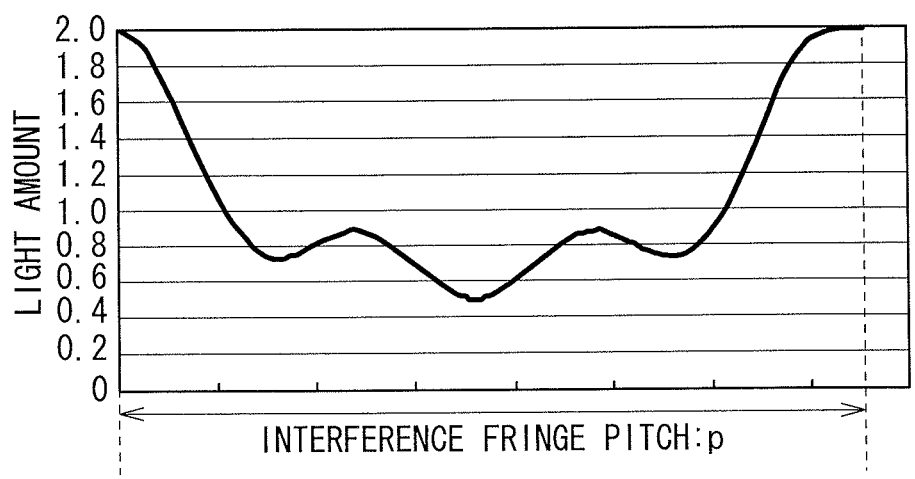

Thus, in this entire example, interference fringes with, for example, a pattern illustrated in FIG. 11A are produced, and the pitch of the interference fringes (interference fringe pitch p) at this time is, for example, as illustrated in FIG. 11B. The value of "light amount" represented by a vertical axis in FIG. 11B denotes relative brightness of interference fringes (1.0: average brightness). It is to be noted that, even if the number of unit cells in the fly-eye lens 15 is increased, the pattern of the interference fringes is produced by the pitch of the interference fringes produced by a plurality of adjacent unit cells as in this example (a combination of all unit cells in the fly-eye lens 15). Moreover, in actuality, since the unit cells are arranged along both the horizontal direction (the x-axis direction) and the vertical direction (the Y-axis direction), the pattern of the interference fringes typically has a mesh form (a grid-like form).

Figure 12:
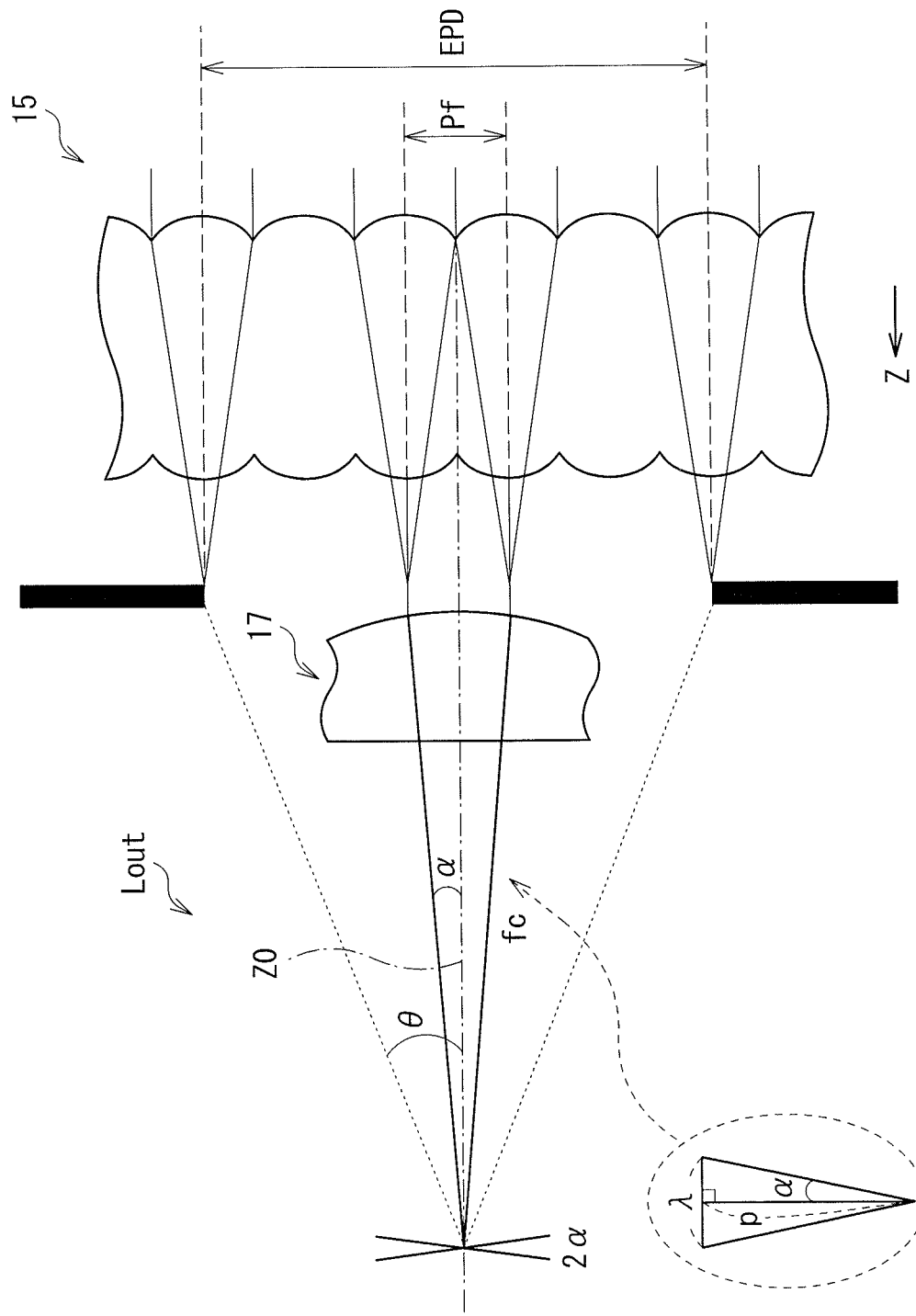
FIG. 12 is a schematic view for describing a technique of calculating an interference fringe pitch.

Now, referring to FIG. 12, a technique of calculating the pitch (the interference fringe pitch p) of the interference fringes produced in such a manner will be described below. In FIG. 12, a wavelength of the outgoing light Lout is λ, an angle between a marginal ray of the outgoing light Lout and the optical axis Z0 and an angle between one ray of the outgoing light Lout and the optical axis Z0 are θ and α, respectively, a focal length and an f-number of the condenser lens 17 are fc and F, respectively, the unit cell number and the unit cell pitch of the fly-eye lens 15 are n and pf, respectively, a numerical aperture is NA, and a diameter of a light flux passing through an illumination optical system is EPD (Entrance Pupil Diameter). The interference fringe pitch p is determined by the following expression (10) with use of a relationship of the following expressions (7) to (9).

$$NA = \sin\theta = \{EPD/(2 \times fc)\} = 1/(2 \times F) \tag{7}$$

$$\sin\alpha = \{Pf/(2 \times fc)\} = 1/(2 \times n \times F) \tag{8}$$

$$\sin\alpha = \{\lambda/(2 \times p)\} \tag{9}$$

$$p = \{(n \times \lambda)/(2 \times NA)\} = (n \times \lambda \times F) \tag{10}$$

It is to be noted that FIG. 13 illustrates calculation examples of the interference fringe pitch p in the case where the unit cell number n is 10 (in Calculation Example 1) and 20 (in Calculation Example 2). FIG. 13 illustrates, as the interference fringe pitch p at this time, the interference fringe pitch p of interference fringes on the reflective liquid crystal device 21 (in this example, a pixel pitch is 0.22 inches) and the interference fringe pitch P of interference fringes on the screen 30 (in this example, a projection size is 25 inches).

(Principle of Reducing Interference Fringes)

To reduce production of interference fringes caused by such a principle, in the illumination device 1 according to the embodiment, the optical device 14 (or the optical device 14B) and the fly-eye lens 15 disposed in a stage following the optical device 14 (or 14B) are so configured as to satisfy the predetermined conditional expression (the above-described expression (1) and the like). Accordingly, as described above, even if interference fringes are produced in illumination light by the fly-eye lens 15, the interference fringes are moved with time to average brightness thereof, and as a result, the interference fringes become less visible.

The principle of reducing interference fringes through satisfying the above-described respective conditional expressions (a reason why the respective conditional expressions are supposed to be set) will be described in detail below.

Figure 14:
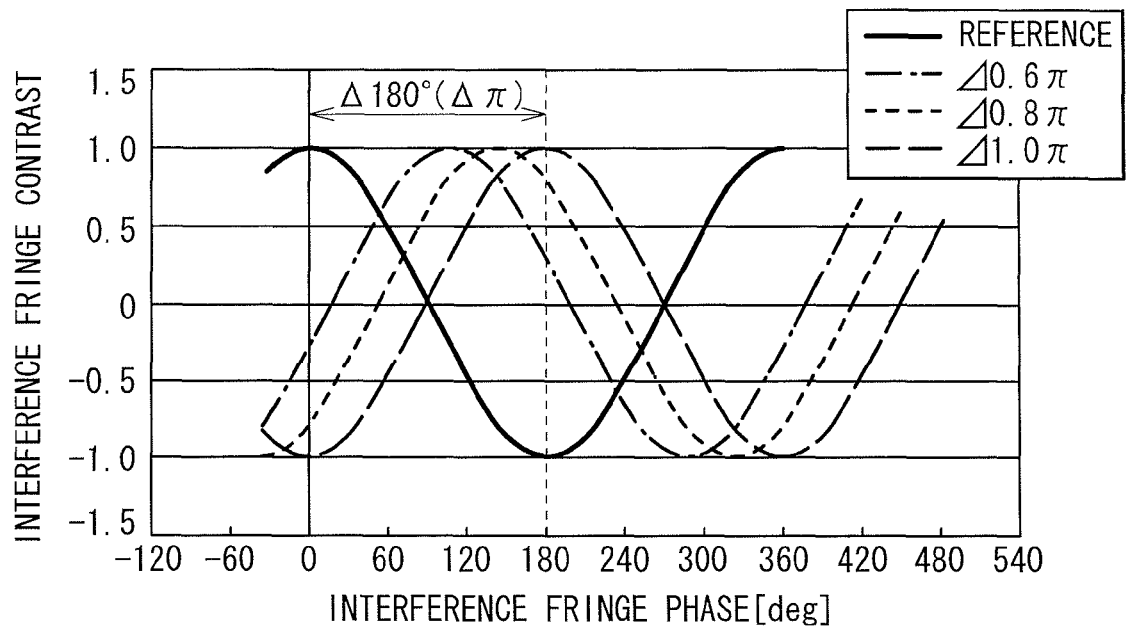
FIG. 14 is a diagram illustrating an example of a relationship between phase and contract in interference fringes.

First, for example, as illustrated in FIG. 14, when phases of a bright state and a dark state in interference fringes is shifted by about 180° (about 1.0 π) or over, the bright state and the dark state are repeated in a time-average manner, and the interference fringes are apparently averaged and become less visible. In this case, shifting the phases thereof by π or over is equivalent to changing the above-described angle 2θ illustrated in FIGS. 10A to 10D into 4θ. More specifically, in the case where an angle between wavefronts of the outgoing light fluxes from two unit cells is 2θ, when a central spot which is in a dark state at a certain point in time is switched into a bright state when the angle between the wavefronts of the outgoing light fluxes is changed into 4θ. When the bright state and the dark state are repeated, the phases thereof is changed by π in the above-described manner, and the brightness of interference fringes are averaged, and are less likely to be observed (become less visible).

Figure 15:
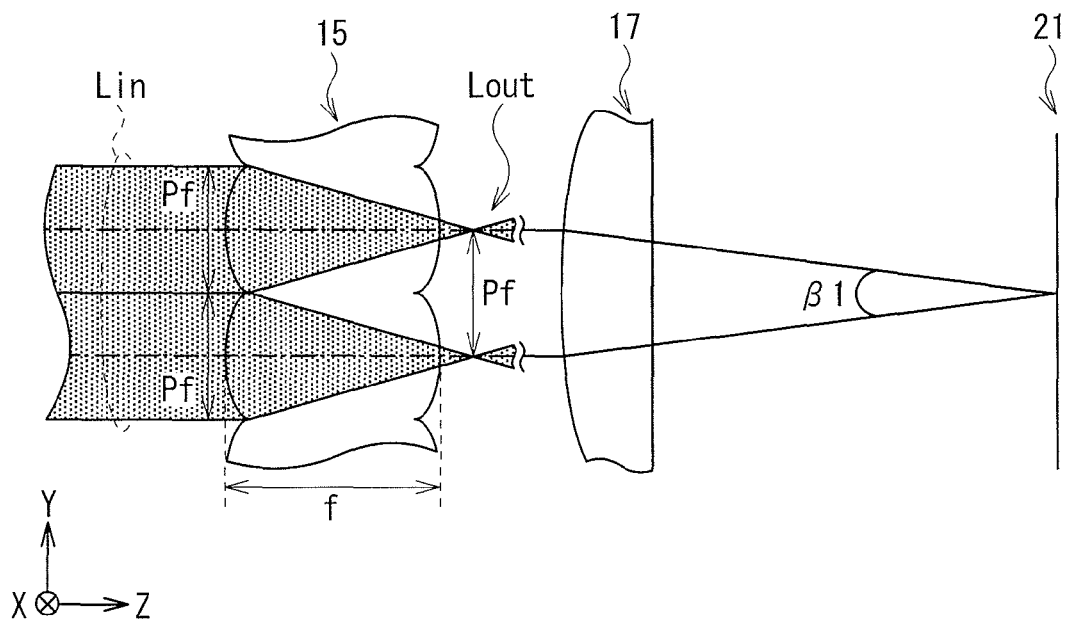
FIG. 15 is a schematic view for describing incident light onto the fly-eye lens in the case where the optical device is not included.

For example, as illustrated in FIG. 15, the case where the optical devices 14 and 14B are not included will be considered below. In this case, since the incident light Lin which is a parallel light flux enters the fly-eye lens 15, light source images are arranged at intervals equal to the pitch Pf of the unit cell on a light-exit side (the outgoing light Lout) of the fly-eye lens 15. Therefore, the light source images at intervals of the pitch Pf are superimposed on each other on the reflective liquid crystal device 21. Thus, an angle (a relative angle) formed when the light source images at intervals of the pitch Pf are superimposed on each other is β1.

On the other hand, for example, as illustrated in FIGS. 16A and 16B, in the case where the optical device 14B is disposed on a light-incident side of the fly-eye lens 15, the following occurs. A marginal ray angle of the incident light Lin which is a convergent light flux as illustrated in FIG. 16A and a marginal ray angle of the incident light Lin which is a divergent light flux as illustrated in FIG. 16B are θf. A maximum image height of a light source image formed on a light-exit side (the outgoing light Lout) of the fly-eye lens 15 is varied to (Pf−2y) (refer to FIG. 16A) and (Pf+2y) (refer to FIG. 16B) according to the position of the optical device 14B which is vibrating. As a result, the relative angle when the light source images are superimposed on each other is varied with time to β2 (refer to FIG. 16A) and β3 (refer to FIG. 16B). The magnitude relation of the relative angles β1, β2, and β3 at this time is represented by the following expression (11).

$$\beta 2 < \beta 1 < \beta 3 \tag{11}$$

As described above, to cause a phase shift π to reduce production of interference fringes, the relative angles β2 and β3 preferably satisfy the following expression (12). More specifically, when the pitch Pf of the unit cell and an image height y in the fly-eye lens 15 are used, a conditional expression satisfying the expression (12) is the following expression (13). Since the image height y is represented by a relational expression, y=(f×tanθf), the above-described expression (1) is obtained by substitution of the relational expression into the expression (13). Thus, to reduce production of interference fringes in illumination light, it is clear that it is necessary to satisfy the above-described expression (1) (the expressions (2) and (3)).

$$(2 \times \beta 2) < \beta 3 \tag{12}$$

$$(Pf+2y) > 2 \times (Pf-2y) \tag{13}$$

However, in actuality, a condition for reducing interference fringes is not determined only by the marginal ray angle θf. Therefore, in the embodiment, both the above-described expressions (4) and (5) are preferably further satisfied with use of the optical device 14B. Thus, as will be described later, production of interference fringes is suppressed more effectively.

Figure 17A:
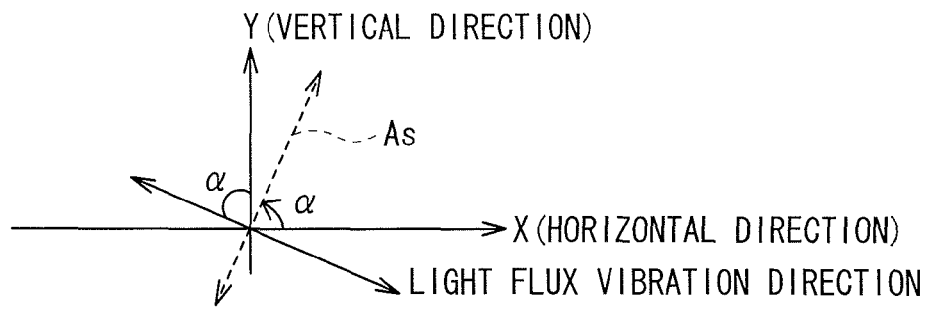
FIGS. 17A and 17B are schematic views for describing a relationship between an inclination angle of an optical surface in the optical device and an aspect ratio of a unit cell in the fly-eye lens.
Figure 17B:
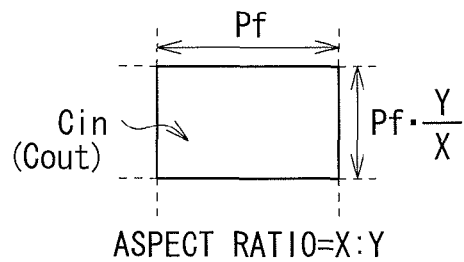

For example, referring to FIGS. 17A and 17B, the above-described marginal ray angle θfh along the X-axis direction (the horizontal direction) and the above-described marginal ray angle θfv along the Y-axis direction (the vertical direction) are represented by the following expressions (14) and (15), respectively. Moreover, a movement amount x of the light source image along the X-axis direction (the horizontal direction) and a movement amount y of the light source image along the Y-axis direction (the vertical direction) are represented by the following expressions (16) and (17) with use of the expressions (14) and (15), respectively.

$$\theta fh = (\theta f \times \sin\alpha) \quad (14)$$

$$\theta fv = (\theta f \times \cos\alpha) \quad (15)$$

$$x = f \times \tan(\theta fh) = f \times \tan\{\theta f \times \sin\alpha\} \quad (16)$$

$$y = f \times \tan(\theta fv) = f \times \tan\{\theta f \times \cos\alpha\} \quad (17)$$

Referring to the expression (13), conditional expressions for increasing the movement amounts x and y to be larger than an amount equivalent to a phase shift amount π are the following expressions (18) and (19). Then, substitution of the expressions (16) and (17) into the expressions (18) and (19) leads to the above-described expressions (4) and (5), respectively.

$$(Pf+2x) > 2 \times (Pf-2x) \quad (18)$$

$$\{(Y/X) \times Pf+2y\} > 2 \times \{(Y/X) \times Pf-12y\} \quad (19)$$

Moreover, in the embodiment, for the upper limit condition of the marginal ray angle θf, the above-described expression (6) is preferably further satisfied. Thus, as will be described later, a light amount loss in the outgoing light (laser light) from the light source section is reduced to improve light use efficiency.

In other words, the marginal ray angle θf which is necessary to cause the phase shift π and the inclination angle α in the optical device 14B each have an appropriate range. When the marginal ray angle θf increases to a certain value or more, interference fringes are reduced (becomes less visible), but when the marginal ray angle θf increases too large, the following issue arises.

First, when the marginal ray angle θf exceeds a predetermined angle (acceptable angle θlimit; θf>θlimit), a light amount loss occurs, resulting in a reduction in light use efficiency. More specifically, when the above-described light source image height (y=f×tanθf) exceeds (Pf/2) (f>(Pf/2)), a light flux start entering not only a target unit cell but also a unit cell adjacent to the target unit cell in the fly-eye lens 15; therefore, a light amount component not entering the reflective liquid crystal device 21 is produced. Therefore, it can be said that when θf≥θlimit (f≥(Pf/2)) is satisfied, such a light amount loss is allowed to be reduced, and light use efficiency is improvable accordingly.

Since the acceptable angle θlimit is limited based on the size of the unit cell in the fly-eye lens 15, the Y-axis direction (a relatively small size) is a limiting condition, where the aspect ratio in the unit cell (the anisotropic shape) is X:Y (X>Y), as described above. Therefore, the above-described conditional expression (6) is obtained by substitution of the above-described expression (17) and the pitch (Pf×(Y/X)) along the Y-axis direction of the unit cell (refer to FIG. 17B) into the above-described conditional expression (f≥(Pf/2)).

Thus, in the embodiment, the predetermined conditional expression (the above-described expression (1) and the like) is satisfied in the optical device 14 which is disposed on the optical path between the light source section and the fly-eye lens 15 and vibrates and the fly-eye lens 15; therefore, even if interference fringes is produced in illumination light by the fly-eye lens 15, the interference fringes is moved with time to allow brightness of the interference fringes to be averaged. Thus, such interference fringes become less visible, and luminance unevenness in illumination light is allowed to be reduced (display image quality is improvable).

Moreover, in the embodiment, unlike a technique of reducing interference fringes with use of a device disturbing a phase, for example, a diffuser, a light amount loss is not caused when the interference fringes are reduced. Therefore, production of interference fringes are allowed to be suppressed without reducing light use efficiency of laser light or the like emitted from the light source.

It is to be noted that, as described above, patterns of the interference fringes are produced mainly in the vertical direction and the horizontal direction based on the arrangement of the unit cells in the fly-eye lens 15; however, in actuality, interference fringes are produced by interference between the outgoing light fluxes from the unit cells obliquely adjacent to each other. More specifically, for example, in the case where the aspect ratio of the unit cell is X:Y=16:9, interference fringes are produced in a 30° (=arctan(9/16)) direction and a 150° (=arctan(9/16)) direction in addition to the horizontal direction (a 0° direction) and the vertical direction (a 90° direction).

However, as with the optical device 14B according to the embodiment, in the case where the extending direction (the optical-surface-extending axis As) of the optical surface and the arrangement direction of the unit cells are inclined with respect to each other, interference fringes produced in such an oblique direction are also allowed to be reduced. More specifically, for example, in the case where the inclination angle α is 45°, when the optical device 14B with this single-axis configuration (a configuration in which the optical-surface-extending axis As is oriented along one direction) vibrates only along one direction (for example, the above-described Y-axis direction), interference fringes in not only the vertical and horizontal directions but also the oblique direction are allowed to be reduced. Since measures are taken by the optical device 14B with the single-axis configuration, the optical device is easily manufacturable, compared to, for example, an optical device with a 2-axis configuration or a 4-axis configuration.

Further, in the optical device 14B according to the embodiment, since, as described above, the extending direction (the optical-surface-extending axis A) of the optical surface and the arrangement direction of the unit cells are inclined with respect to each other, the following effect is obtainable. Crosstalk in a boundary region between the unit cells (the incident-side unit cells Cin and the exit-side unit cells Cout) in the fly-eye lens 15 and at a connection boundary line between the convergent light flux and the divergent light flux is allowed to be reduced.

(Modification)

Next, a modification of the above-described embodiment will be described below. It is to be noted that like components are denoted by like numerals as of the embodiment and will not be further described.

[Configuration of Optical Device 14A]

Figure 18:
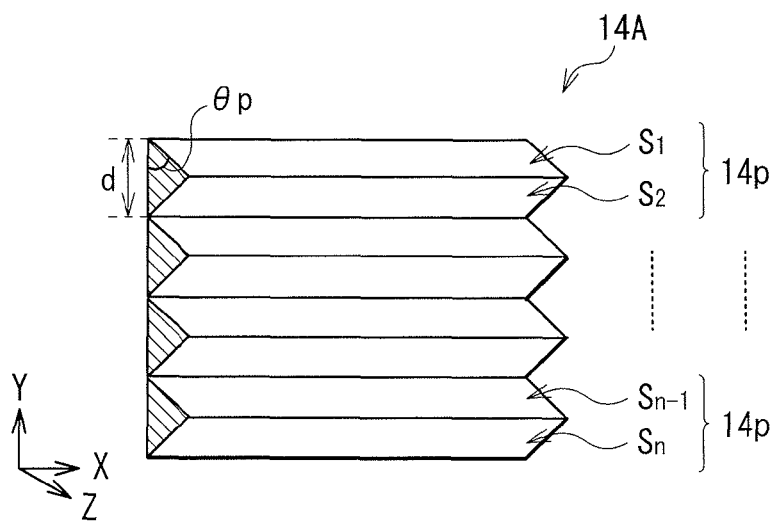
FIG. 18 is a schematic view illustrating a configuration example of an optical device according to a modification.

FIG. 18 illustrates a schematic perspective view of a configuration example of an optical device (an optical device 14A) according to a modification. An illumination device (a display unit) according to the modification has a configuration similar to that of the illumination device 1 (the display unit 3) illustrated in FIG. 1, except that the optical device 14A is included instead of the optical device 14 (or the optical device 14B).

The optical device 14A according to the modification is configured of a prism array, as will be described later. More specifically, the optical device 14A is configured of a plurality of (in this case, n/2, where n is an integer of 2 or more) of prisms 14p which are arranged along the Y-axis direction. Each of the prisms 14p has a pair of inclined surfaces extending along the X-axis direction on a laser-light-exit side (a +Z-axis side). In other words, these prisms 14p are arranged side-by-side along a direction (the Y-axis direction) orthogonal to the extending direction (the X-axis direction) of the pairs of inclined surfaces in a light-exit surface (an X-Y plane). More specifically, a first prism 14p, a second prism 14p, . . . , and an (n/2)th prism 14p which are arranged in order in a negative direction of the Y axis in the drawing have a pair of an inclined surface (a first surface) $S_1$ and an inclined surface (a second surface) $S_2$, a pair of an inclined surface (a third surface) $S_3$ and an inclined surface (a fourth surface) $S_4$, . . . , and a pair of an inclined surface (an (n−1)th surface) $S_{n-1}$ and an inclined surface (an nth surface) $S_n$, respectively. Thus, each of the prisms 14p has a triangular prism shape (a pitch (a prism pitch) along the Y-axis direction: d, an inclination angle of each inclined surface: θp) extending along the X-axis direction, and protrusions (convex sections) and depressions (concave sections) are alternately formed on the entire light-exit surface. It is to be noted that, in this example, each of the convex sections (the inclined surfaces) is disposed on an exit-surface side of each of the prisms 14p; however, this is not limitative. The convex sections may be disposed on one or both of an incident-surface side and the exit-surface side of each of the prisms 14p.

[Functions and Effects of Optical Device 14A]

Figure 19:
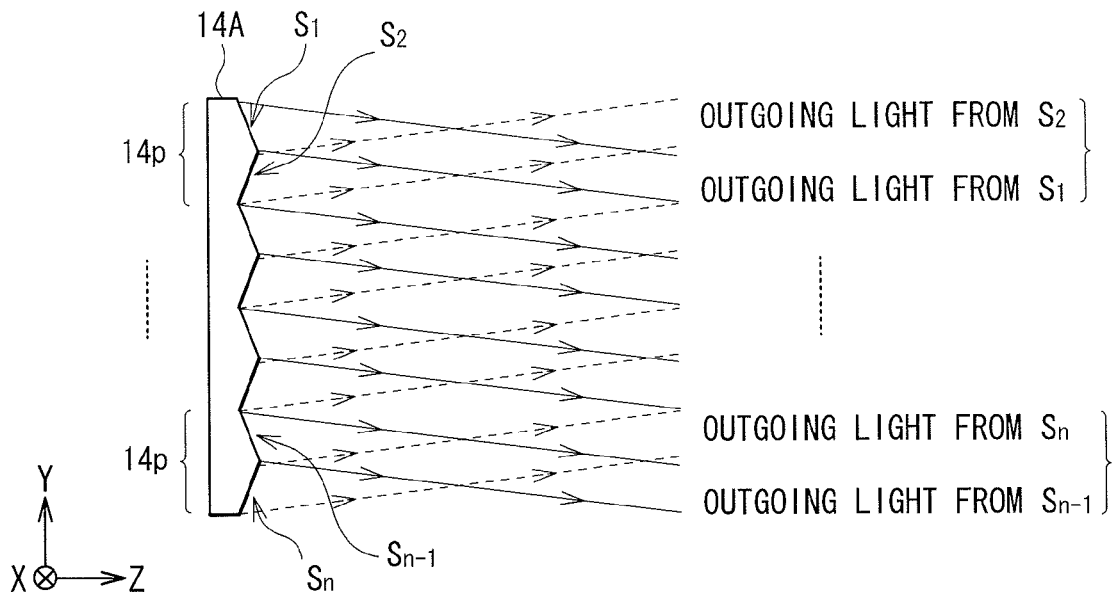
FIG. 19 is a schematic view for describing a function of the optical device illustrated in FIG. 18.

In the optical device 14A, incident light onto each of the prisms 14p exits from the pair of inclined surfaces in the following manner. For example, as illustrated in FIG. 19, outgoing light exits from the optical device 14A such that a position of incident light and a position of outgoing light on a plane located at a predetermined distance from the optical device 14A (in this case, on an incident surface of the fly-eye lens 15) are switched with respect to each other in the pair of inclined surfaces of each of the prisms 14p. More specifically, in the above-described first prism 14p in the optical device 14A, an incident position of incident light and the position of outgoing light on the incident surface of the fly-eye lens 15 are switched with respect to each other between the inclined surface $S_1$ and the inclined surface $S_2$. In other words, while outgoing light from the inclined surface $S_1$ is emitted toward the incident position (a lower side in an exit surface of the first prism 14p) of incident light on the inclined surface $S_2$, outgoing light from the inclined surface $S_2$ is emitted toward the incident position (an upper side in the exit surface of the first prism 14p) of the incident light on the inclined surface $S_1$. Likewise, in the above-described (n/2)th prism 14p, the incident position of the incident light and the position of the outgoing light on the incident surface of the fly-eye lens 15 are switched with respect to each other between the inclined surface $S_{n-1}$ and the inclined surface $S_n$. In other words, while outgoing light from the inclined surface $S_{n-1}$ is emitted toward the incident position (a lower side in an exit surface of the (n/2)th prism 14p) of the incident light on the inclined surface $S_n$, outgoing light from the inclined surface $S_n$ is emitted toward the incident position (an upper side in the exit surface of the (n/2)th prism 14p) of the incident light on the inclined surface $S_{n-1}$. It is to be noted that such a function of switching the positions of incident light and outgoing light with respect to each other is optionally adjustable by setting of the prism pitch d and the inclination angle θp illustrated in FIG. 18.

Figure 20:
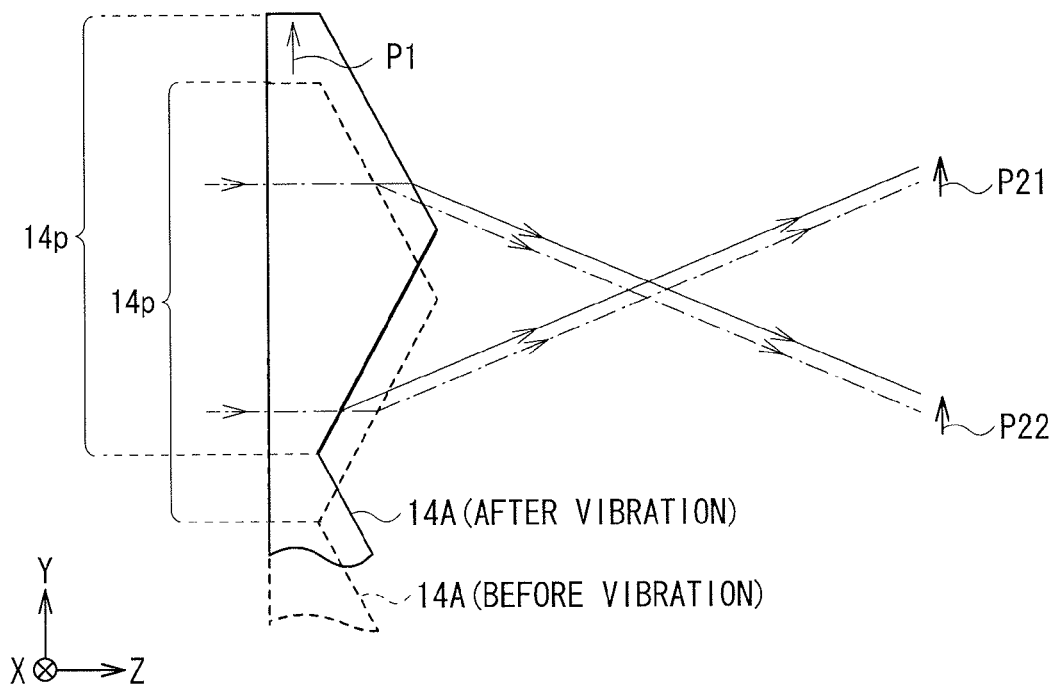
FIG. 20 is a schematic view for describing beam scanning by vibration of the optical device illustrated in FIG. 18.

Then, the drive section 140 moves a relative position between the optical device 14A and the fly-eye lens 15. More specifically, in the modification, as indicated by, for example, an arrow P1 in FIG. 20, the drive section 140 vibrates the optical device 14A along an arrangement direction (the Y-axis direction) of the prisms 14p in a plane orthogonal to the optical axis Z0 to move the above-described relative position. In other words, as indicated by, for example, arrows P21 and P21 in FIG. 20, positions of outgoing light from the inclined surfaces of each of the above-described prisms 14p (outgoing light so emitted from the inclined surfaces that the positions thereof are switched with respect to each other between the pair of inclined surfaces) are also moved (shifted) along the Y-axis direction. Thus, beam scanning by the incident light from each of the prisms 14p in the optical device 14A is performed on the incident surface of the fly-eye lens 15.

As a result, also in the modification, effects similar to those of the above-described embodiment are obtainable by functions similar to those of the above-described embodiment. In other words, production of interference fringes and speckle noise is allowed to be reduced.

As described above, the configuration of the optical device in the present disclosure is not limited to those (the optical devices 14 and 14B) described in the above-described embodiment, and the optical device may have any other configuration.

(Other Modifications)

Although the technology of the present disclosure is described referring to the embodiment and the modification, the technology is not limited thereto, and may be variously modified.

For example, in the above-described embodiment and the like, a case where the "uniformization optical member" in the disclosure is configured of the fly-eye lens is described as an example; however, the uniformization optical member may be configured of any other optical member (for example, a rod integrator).

Moreover, a case where the optical devices 14, 14A, and 14B described in the above-described embodiment and the like each have a corrugated configuration or an inclined-surface configuration on the light-exit surface thereof is described; however, the optical device is not limited thereto. For example, the optical device may have a corrugated configuration or an inclined-surface configuration formed on the light-incident surface thereof or on both the light-incident surface and the light-exit surface thereof Further, in the above-described embodiment and the like, a case where a plurality of kinds (red, green, and blue) of light sources are all laser light sources is described; however, the technology is not limited thereto, and one or more of the plurality of kinds of light sources may be laser light sources. In other words, a combination of a laser light source and any other light source (for example, an LED) may be included in the light source section.

In the above-described embodiment and the like, a case where the light modulation device is the reflective liquid crystal device is described as an example; however, the technology is not limited thereto. Alternatively, the light modulation device may be, for example, a transmissive liquid crystal device, or a light modulation device other than the liquid crystal devices (for example, a DMD (Digital Micromirror Device).

In the above-described embodiment and the like, a case where three kinds of light sources emitting light of different wavelengths are used is described; however, for example, one kind, two kinds, or four or more kinds of light sources may be used, instead of the three kinds of light sources.

In the above-described embodiment and the like, respective components (optical systems) of the illumination device and the display unit are specifically described; however, it is not necessary to include all of the components, or other components may be further included. More specifically, for example, dichroic mirrors may be included, instead of the dichroic prisms 131 and 132.

In the above-described embodiment and the like, the projection display unit configured through including the projection optical system (the projection lens) which projects, onto the screen, light modulated by the light modulation device is described; however, the technology is also applicable to a direct-view display unit and the like.

It is to be noted that the technology may have the following confirmations.

(1) An illumination device including:
a light source section including a laser light source;
a uniformization optical member including a plurality of unit cells which are two dimensionally arranged, and receiving light from the light source section;
an optical device disposed on an optical path between the light source section and the uniformization optical member; and
a drive section vibrating the optical device,
in which an expression [1] is satisfied:

$$\{6 \times f \times \tan(\theta f)\} > Pf \quad [1]$$

where f is a focal length of the unit cell, Pf is a pitch of the unit cell, θf is a marginal ray angle in a light flux emitted from the optical device to enter the uniformization optical member.

(2) The illumination device according to (1), in which each of the unit cells has an anisotropic shape with a major-axis direction and a minor-axis direction, and
the expression [1] is satisfied for both the major-axis direction and the minor-axis direction.

(3) The illumination device according to (2), in which the optical device has a first optical surface emitting laser light incident thereon while converging the laser light and a second optical surface emitting laser light incident thereon while diffusing the laser light,
extending directions of the first optical surface and the second optical surface and an arrangement direction of the unit cells are inclined with respect to each other at an inclination angle α, and
an expression [2] and an expression [3] are further satisfied, where a pitch along the major-axis direction of the unit cell is the Pf, and an aspect ratio in the unit cell is X:Y (X>Y):

$$\{6 \times f \times \tan(\theta f \times \sin\alpha)\} > Pf \quad [2], \text{and}$$

$$\{6 \times f \times \tan(\theta f \times \cos\alpha)\} > \{(Y/X) \times Pf\} \quad [3].$$

(4) The illumination device according to (3), in which an expression [4] is further satisfied:

$$\{f \times \tan(\theta f \times \cos\alpha)\} < \{(1/2) \times (Y/X) \times Pf\} \quad [4].$$

(5) The illumination device according to any one of (1) to (4), in which the optical device has a first optical surface emitting laser light incident thereon while converging the laser light and a second optical surface emitting laser light incident thereon while diffusing the laser light.

(6) The illumination device according to (5), in which extending directions of the first optical surface and the second optical surface and an arrangement direction of the unit cells are inclined with respect to each other.

(7) The illumination device according to (5) or (6), in which the first optical surface is a convex-curved surface, and the second optical surface is a concave-curved surface.

(8) The illumination device according to any one of (5) to (7), in which a pitch of the first optical surface and a pitch of the second optical surface are different from each other.

(9) The illumination device according to any one of (1) to (8), in which the uniformization optical member is configured of a fly-eye lens.

(10) The illumination device according to any one of (1) to (9), in which the light source section includes, as the laser light source, three kinds of laser light sources emitting red light, green light, and blue light.

(11) The illumination device according to any one of (1) to (10), in which the laser light source is a laser diode.

(12) A display unit including:
an illumination device emitting illumination light; and
a light modulation device modulating the illumination light, based on an image signal,
in which the illumination device includes
a light source section including a laser light source,
a uniformization optical member including a plurality of unit cells which are two dimensionally arranged, and receiving light from the light source section,
an optical device disposed on an optical path between the light source section and the uniformization optical member, and
a drive section vibrating the optical device, and
an expression [1] is satisfied:

$$\{6 \times f \times \tan(\theta f)\} > Pf \quad [1]$$

where f is a focal length of the unit cell, Pf is a pitch of the unit cell, θf is a marginal ray angle in a light flux emitted from the optical device to enter the uniformization optical member.

(13) The display unit according to (12), further including a projection optical system projecting the illumination light modulated by the light modulation device onto a projection surface.

(14) The display unit according to (12) or (13), in which the light modulation device is a liquid crystal device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illumination device comprising:
a light source section including a laser light source;
a uniformization optical member including a plurality of unit cells which are two dimensionally arranged, and receiving light from the light source section;
an optical device disposed on an optical path between the light source section and the uniformization optical member; and a drive section vibrating the optical device,
wherein an expression (1) is satisfied:

$$\{6 \times f \times \tan(\theta f)\} > Pf \tag{1}$$

where f is a focal length of the unit cell, Pf is a pitch of the unit cell, θf is a marginal ray angle in a light flux emitted from the optical device to enter the uniformization optical member.

2. The illumination device according to claim 1, wherein each of the unit cells has an anisotropic shape with a major-axis direction and a minor-axis direction, and
the expression (1) is satisfied for both the major-axis direction and the minor-axis direction.

3. The illumination device according to claim 2, wherein the optical device has a first optical surface emitting laser light incident thereon while converging the laser light and a second optical surface emitting the laser light incident thereon while diffusing the laser light,
extending directions of the first optical surface and the second optical surface and an arrangement direction of the unit cells are inclined with respect to each other at an inclination angle α, and
an expression (2) and an expression (3) are further satisfied, where a pitch along the major-axis direction of the unit cell is the Pf, and an aspect ratio in the unit cell is X:Y (X>Y):

$$\{6 \times f \times \tan(\theta f \times \sin\alpha)\} > Pf \tag{2, and}$$

$$\{6 \times f \times \tan(\theta f \times \cos\alpha)\} > \{(Y/X) \times Pf\} \tag{3}$$

4. The illumination device according to claim 3, wherein an expression (4) is further satisfied:

$$\{f \times \tan((\theta f \times \cos\alpha)\} < \{(1/2) \times (Y/X) \times Pf\} \tag{4}$$

5. The illumination device according to claim 1, wherein the optical device has a first optical surface emitting laser light incident thereon while converging the laser light and a second optical surface emitting the laser light incident thereon while diffusing the laser light.

6. The illumination device according to claim 5, wherein extending directions of the first optical surface and the second optical surface and an arrangement direction of the unit cells are inclined with respect to each other.

7. The illumination device according to claim 5, wherein the first optical surface is a convex-curved surface, and the second optical surface is a concave-curved surface.

8. The illumination device according to claim 5, wherein a pitch of the first optical surface and a pitch of the second optical surface are different from each other.

9. The illumination device according to claim 1, wherein the uniformization optical member is configured of a fly-eye lens.

10. The illumination device according to claim 1, wherein the light source section includes, as the laser light source, three kinds of laser light sources emitting red light, green light, and blue light.

11. The illumination device according to claim 1, wherein the laser light source is a laser diode.

12. A display unit comprising:
an illumination device emitting illumination light; and
a light modulation device modulating the illumination light, based on an image signal,
wherein the illumination device includes
a light source section including a laser light source,
a uniformization optical member including a plurality of unit cells which are two dimensionally arranged, and receiving light from the light source section,
an optical device disposed on an optical path between the light source section and the uniformization optical member, and
a drive section vibrating the optical device, and
an expression (1) is satisfied:

$$\{6 \times f \times \tan(\theta f)\} > Pf \tag{1}$$

where f is a focal length of the unit cell, Pf is a pitch of the unit cell, θf is a marginal ray angle in a light flux emitted from the optical device to enter the uniformization optical member.

13. The display unit according to claim 12, further comprising a projection optical system projecting the illumination light modulated by the light modulation device onto a projection surface.

14. The display unit according to claim 12, wherein the light modulation device is a liquid crystal device.

* * * * *